(12) United States Patent
Morse

(10) Patent No.: US 7,872,363 B2
(45) Date of Patent: Jan. 18, 2011

(54) WAVE ENERGY HARVESTING AND HYDROGEN-OXYGEN GENERATION SYSTEMS AND METHODS

(76) Inventor: Arthur P. Morse, 215 Musket Cir., Lansdale, PA (US) 19446

( * ) Notice: Subject to any disclaimer, the term of this patent is extended or adjusted under 35 U.S.C. 154(b) by 633 days.

(21) Appl. No.: 11/734,357

(22) Filed: Apr. 12, 2007

(65) Prior Publication Data

US 2008/0038061 A1    Feb. 14, 2008

Related U.S. Application Data

(60) Provisional application No. 60/791,972, filed on Apr. 13, 2006.

(51) Int. Cl.
F03B 13/12 (2006.01)

(52) U.S. Cl. .......................... 290/42; 290/53
(58) Field of Classification Search ............... 290/42, 290/53; 405/75, 76; 60/497; 114/294, 311
See application file for complete search history.

(56) References Cited

U.S. PATENT DOCUMENTS

| | | | |
|---|---|---|---|
| 61,983 | A | 2/1867 | Baker |
| 3,484,617 | A | 12/1969 | August |
| 3,754,147 | A | 8/1973 | Hancock et al. |
| 4,087,976 | A | 5/1978 | Morrow, Jr. et al. |
| 4,099,489 | A | 7/1978 | Bradley |
| 4,172,689 | A | 10/1979 | Thorsheim |
| 4,384,212 | A | 5/1983 | Layeyre |
| 4,622,473 | A * | 11/1986 | Curry .......................... 290/53 |
| 4,850,190 | A | 7/1989 | Pitts |
| 4,883,823 | A | 11/1989 | Perry, Jr. et al. |
| 5,186,822 | A | 2/1993 | Tzong et al. |
| 5,394,852 | A | 3/1995 | McAlister |
| 5,549,445 | A | 8/1996 | Schremp |
| 6,257,175 | B1 | 7/2001 | Mosher et al. |
| 6,787,258 | B2 | 9/2004 | Prerad |
| 6,791,206 | B1 | 9/2004 | Woodbridge |
| 6,812,588 | B1 | 11/2004 | Zadig |
| 6,833,631 | B2 | 12/2004 | Van Breems |
| 6,864,596 | B2 | 3/2005 | Maiwald et al. |
| 6,896,789 | B2 | 5/2005 | Ross |
| 6,918,350 | B1 | 7/2005 | Morse |

(Continued)

FOREIGN PATENT DOCUMENTS

DE    4134692 A1 *    5/1992

(Continued)

*Primary Examiner*—Sunil Singh
(74) *Attorney, Agent, or Firm*—O'Connell Law Firm

(57) ABSTRACT

A system for harvesting energy from wave oscillation includes an energy harvesting vessel and, possibly, a transport vessel. The energy harvesting vessel can have multiple hulls disposed in parallel with wave channels there between for receiving incoming waves. Multiple bobber devices can be disposed in series within each wave channel to absorb energy from incoming waves. Reciprocating movement of buoyant float heads of the bobber devices can be converted to electrical energy by a hydraulic engine and a generator. The electrical energy can power an electrolyzer to separate supplied water into hydrogen and oxygen. Once harvested, the hydrogen and oxygen can be transferred between storage tanks on the energy harvesting vessel and the transport vessel for transport and usage. A horizontal movement sea anchor can resist undesired horizontal movement, and a vertical movement sea anchor can resist undesired vertical movement.

28 Claims, 20 Drawing Sheets

U.S. PATENT DOCUMENTS

| | | |
|---|---|---|
| 7,012,340 B2 | 3/2006 | Yi |
| 7,021,249 B1 | 4/2006 | Christison |
| 7,199,481 B2 * | 4/2007 | Hirsch .......................... 290/42 |
| 7,245,041 B1 * | 7/2007 | Olson .......................... 290/53 |
| 7,525,213 B2 * | 4/2009 | Nagata et al. ................. 290/53 |
| 2003/0168864 A1 * | 9/2003 | Heronemus et al. ........... 290/55 |
| 2004/0061338 A1 | 4/2004 | Woodbridge |
| 2005/0052031 A1 | 3/2005 | Atiya |
| 2005/0217991 A1 | 10/2005 | Dahlquist |
| 2006/0029893 A1 | 2/2006 | Hsu |
| 2006/0162642 A1 | 7/2006 | Morse |
| 2006/0196189 A1 | 9/2006 | Rabbat |
| 2006/0219190 A1 | 10/2006 | Balan et al. |
| 2007/0001462 A1 | 1/2007 | McNeil |

FOREIGN PATENT DOCUMENTS

| | | |
|---|---|---|
| GB | 2383978 | 7/2003 |

* cited by examiner

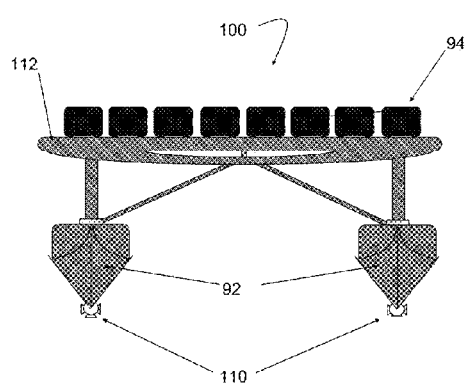
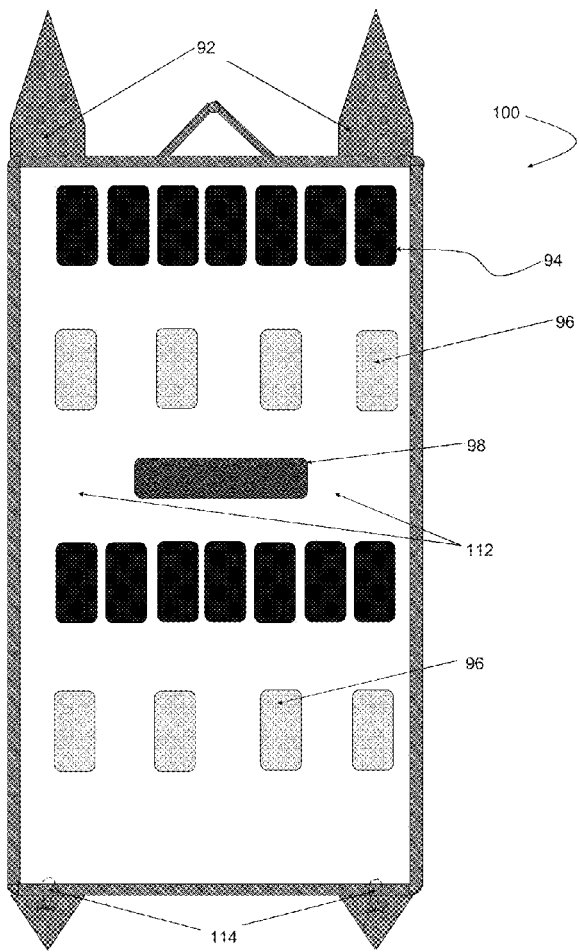
FIG. 17B
FIG. 17A

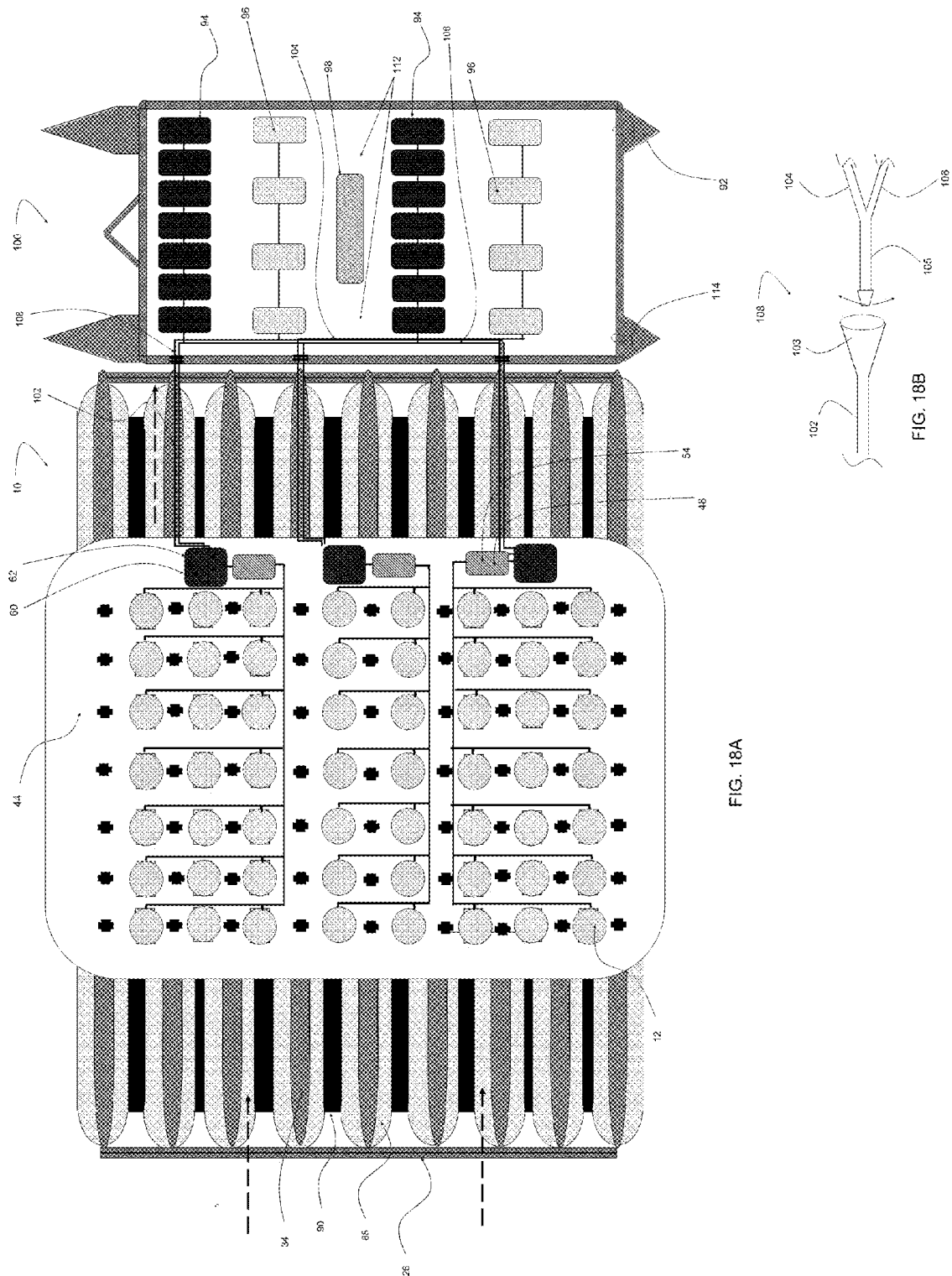

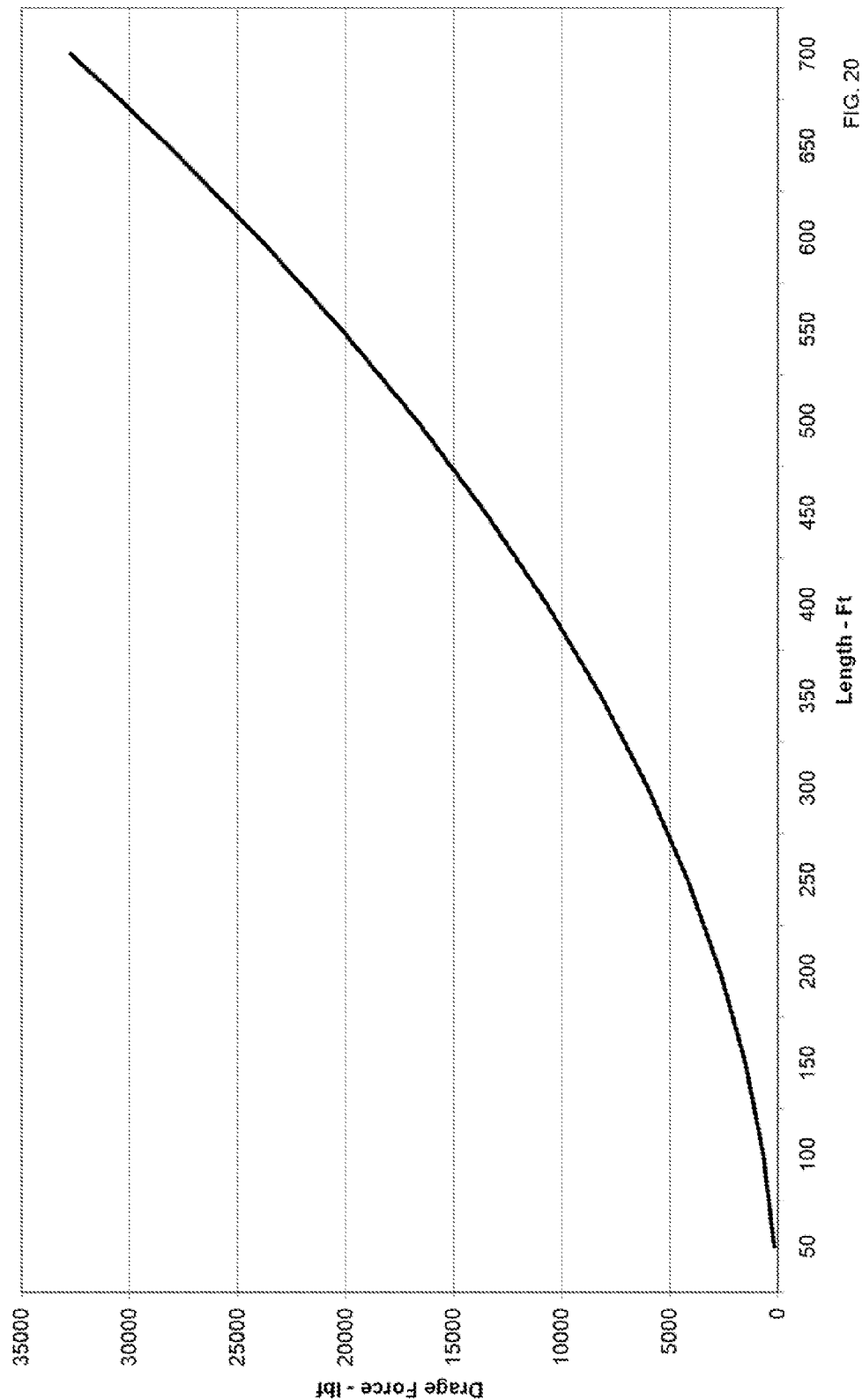

WAVE ENERGY HARVESTING AND HYDROGEN-OXYGEN GENERATION SYSTEMS AND METHODS

RELATED APPLICATIONS

This application is related to U.S. Pat. No. 6,918,350, issued Jul. 19, 2005; application Ser. No. 11/105,980, filed Apr. 14, 2005; Application No. 60/823,276, filed Aug. 23, 2006; and Application No. 60/791,972, filed Apr. 13, 2006, the disclosures of the same being expressly incorporated herein by reference.

FIELD OF THE INVENTION

The present invention relates generally to systems and methods for energy conversion More particularly, disclosed herein are water-body applied systems and methods for harvesting wave energy and, in certain embodiments, for employing that energy to produce hydrogen and oxygen through electrolysis.

BACKGROUND OF THE INVENTION

Trade winds travel from west to east across the United States and onto the Atlantic Ocean. As wind comes in contact with the land on the west coast, the land absorbs energy from the wind at low altitudes. As the terrain changes from hills and mountains on the west coast to flat lands across the Great Plains and back to hills on the east coast, winds at high levels periodically dip down into low-lying areas causing inconsistent wind conditions. Also, atmospheric and land conditions combine with thermals, such as those resulting from the sun rays reflecting off the land, to create high and low pressure areas, thereby further contributing to variations in wind speed and density.

These factors translate into increasingly significant site limitations for harvesting energy the farther eastward across the country one looks. As a result, most alternative energy projects, such as wind farms, are located on the west coast, to take advantage of the better wind quality at low altitudes typically found in those areas. Such sites are often unavoidably located in populated areas thereby being subject to high land costs and potential political resistance.

Once wind reaches the Atlantic Ocean, cool water and the absence of terrain allow the higher-level trade winds to drop to lower altitudes. Ocean water tends to absorb wind energy thereby creating waves. Wave heights and periods correlate well with wind speed whereby increases in average wind speed lead to increases in average wave height. As wave height increases, the volume of water making up that wave increases significantly. Due to the high density of water (64.2 lbs/ft$^3$), waves could produce large quantities of energy, if harvested.

The present inventor has appreciated that, for many reasons, the ocean is an ideal location to exploit wind and wave energy. The best wind quality on the planet exists off shore. Ocean winds are steadier and stronger due to the absence of obstructions. As a result, waves are steady and predictable based on wind speed. To achieve energy conversion, the present inventor has further conceived of employing a mobile, open water based vessel and, in certain embodiments, of a plurality of such energy conversion vessels deployed in a flotilla.

Wave energy harvesting machines have been disclosed by the prior art. However, they are generally shore based and intended to generate electricity for sale through fixed power grids. Consequently, they are limited by, among other things, site limitations, the cost of ocean front property, and political issues such that enjoying profitability relative to traditional wave power systems is a challenge at best. In addition, since the best quality and most consistent wave activity occurs miles off shore, shore or near-shore sites with acceptable wave activity are relatively rare while acceptable deep ocean sites are almost unlimited. Furthermore, since the horizon is about 20 to 25 miles from land, offshore wave vessels beyond the horizon would not be visible from land thereby limiting or entirely obviating opposition.

Sites in or near ocean expanses employing wind turbine technology to generate electricity do exist. Many of these sights are located in the Baltic Sea. Denmark has aggressive plans to convert most of its energy generation to wind within the next decade. In the United States, locations have been suggested for wind turbine construction, including off the coast of Cape Cod in Massachusetts.

A major drawback with such projects is that they rely on land-based wind turbine technology in on-shore or marginally offshore applications. The turbine sites must be connected directly to a power grid to enable electrical energy to be sold. In addition, since they are close to land, such applications are impacted by the land effect conditions discussed above thereby further negatively affecting annual returns on investment. Still further, these systems are anchored directly to the ocean bottom and, therefore, require shallow ocean depths. For example, the Baltic Sea and Massachusetts coastal applications are possible since each has locations with depths of fifty feet or less. Yet another limitation on current wind farms is that they must be physically close to their demand to minimize transmission line losses. Consequently, most regions have a dearth of acceptable locations for wind energy generation.

With an appreciation for the foregoing, the present inventor has realized that systems for extracting energy from wind or waves can be ideally located in the open water as free floating structures. Site limitations, land costs, and political opposition are entirely or nearly entirely eliminated, and wind and wave conditions are ideal. Also, opportunities are presented for partnering with aquariums and museums for educational and marketing purposes and the like.

Nonetheless, operating in open water presents challenges. Exposure to harsh conditions demands that equipment be rugged and transportable to resist and avoid damage from storms and other sources. However, long distance water travel can be costly if not controlled. Furthermore, the potential for loss of communication requires robust backup systems and procedures.

One method for converting wave and wind energy to a readily usable form is electrolysis. Of course, the process of electrolysis to yield hydrogen gas and oxygen gas is well known in the art. For example, one will have reference to U.S. Pat. No. 4,457,816 to Galluzzo et al. for an Electrolysis Method for Decomposing Water into Hydrogen gas and Oxygen Gas; U.S. Pat. No. 5,858,185 to Christian for an Electrolytic Apparatus; and U.S. Pat. No. 5,143,025 to Munday for a Hydrogen and Oxygen System for Producing Fuel for Engines, each of which being incorporated herein by reference.

In considering the extraction of power from wind and waves, it will again be noted that there is a close correlation between wind speed and wave height. In approximately 1905, Rear Admiral Sir Francis Beaufort of the Royal Navy devised what is now termed the Beaufort scale, which continues to be a standard measurement. A uniform set of equivalents of Beaufort numbers, wind speed, and sea height was accepted in 1926 and revised slightly in 1946. In 1955, the World Meteorological Organization established a correspondence between the Beaufort Number, wind speed, and wave height. For instance, at Beaufort No. 3, winds are 7-10 knots, scattered whitecaps appear, and the seas are 2-3 feet in height. At Beaufort No. 5, wind velocity is 17-21 knots, some spray appears, and wave height is 6-8 feet.

It is well understood that other factors can cause wave heights to depart from the Beaufort scale at any particular wind speed. For instance, high waves may appear after a storm even in the absence of wind, particularly near the shore. Also, bottom conditions may cause wave heights to vary widely from the numbers established by Beaufort.

However, under normal conditions on the high seas, there will be a reasonably close correlation between wind speed and wave heights in accordance with the standards published by the World Meteorological Organization. Therefore, conditions that favor wind power generation over water, such as the wind farms operating in the Baltic Sea or proposed system for off the coast of Cape Cod, also favor use of wave power generation systems.

To more fully understand the potential for energy production in such wave energy conversion vessels, an understanding of annual wave activity is needed. Studies have indicated that wind patterns over the globe follow a "Weibull" statistical distribution. The shape and size of the distribution vary from site to site, but the overall distribution is the same. The distribution illustrated in FIG. 1 was extracted from a training publication from the Danish Wind Turbine Manufactures Association from wind recorded on location in the Baltic Sea where a large wind farm is currently in operation. It demonstrates the probability of achieving various wind speeds throughout the year. FIG. 1 indicates the percentage of time per year wind speeds achieve different speeds in miles per hour.

As FIG. 1 shows, the average wind will travel at approximately 11 miles per hour 10.8% of the time during a given year. Wind speeds will range from 0 to 48 MPH during a typical year. It is anticipated that from year to year the profile and length of the distribution will vary However, the distribution does provide an estimate to use in calculating future wind trends.

In the United States, the National Ocean and Atmospheric Administration (NOAA) monitors weather conditions off the coast of the United States. The National Data Buoy Center, which is part of NOAA, publishes historical data at given locations where buoys are anchored. Data from three locations were examined: Station 44008 located 54 nautical miles southeast of Nantucket, Mass., Station 44025 located in Long Island Sound 33 nautical miles south of Islip, N.Y., and Station 44011 located 170 nautical miles northeast of Hyannis, Mass. representing 9, 25, and 7 years of wind speeds, wave heights, and wave period data respectively.

The data indicates that the average and maximum wind speeds off the east coast of the United States is very similar to those in the Baltic Sea in that the annual average is about 12½ MPH and the daily maximums are in the high 40's to low 50's. Based on this similarity and for ease of calculation, the data in FIG. 1 depicting wind performance in the Baltic Sea will be used as the basis for the remaining calculations and discussion for wind distributions on the northeast coast of the United States. Based on the data generated from NOAA, the theoretical predictions set forth below are conservative since there is nearly a three mile per hour difference between the average wind speeds offshore of Cape Cod and the wind speeds in the Baltic Sea.

In FIG. 2, each type of line represents data from a different location near the New England coastline. The square points represent data from Station 44025, which is in the Long Island Sound 33 nautical miles south of Islip, N.Y., diamond points present data from Station 44008 is located 54 nautical miles southeast of Nantucket, and data from Station 44011, which is located 170 nautical miles north east of Hyannis, Mass. is indicated in triangles points. This data represents average wave heights at average wind speeds over many years. Average winds and wave heights change from month to month dependent on the season.

From the scatter plot of FIG. 2, one will realize that, the farther the buoys are located away from land and the deeper the water, the better the relationship is between wind speed and wave height and the higher the waves are for a given wind speed. For example, when the wind averages 12½ knots, the buoy located 33 nautical miles off Islip, N.Y., experiences waves that average about 4 feet while waves at the buoy disposed 170 nautical miles off the coast of Massachusetts are almost 7 feet at the same wind speed.

A statistical correlation can be determined between wind speed and wave height. This enables the prediction of wave heights and the calculation of expected power output in a wave conversion system of a given size. Given this correlation, wave heights follow the same "Weibull" distribution as does wind. The slope of that correlation will change based on the location at sea. Up to a given terminal point, the farther away from shore, the larger the average wave height. The terminal point can be considered an ideal site location since it yields the best possible annual wave action at the closest point to land.

The terminal point is likely dependent on the distance from land and water depth. For example, FIG. 2 suggests that the terminal point is disposed between 54 to 170 miles off the New England coast. In this case, a flotilla of energy conversion vessels could thus be well located operating about 70 to 90 miles east of Cape Cod.

Based on the correlation between wind speed and wave height, an estimate of wave distributions can be developed. For example, the buoy at Station 44008, which is located 54 nautical miles southeast of Nantucket, may be an advantageous location for wave energy generation. Data generated from that buoy indicates that, historically, waves generally vary in size from 0 to 11 meters or 0 to 36 feet in that location. Given the correlation between wind speed and wave heights, it is logical to substitute the same wind probability distribution across the range of annual wave heights. Eight foot waves occur 10% of the time during the year. Since this location has conservative wave action compared to the Gulf of Mexico, the West Coast, and the like, it will be used as a conservative estimate for calculating annual production outputs of the proposed system.

In addition, an analysis of wave period in seconds and wave height in feet was performed, on a random sampling of data generated in 2004 at Station 44008, which is again noted to be located 54 nautical miles southeast of Nantucket. FIG. 4 illustrates the strong, direct correlation between wave period and wave height. This information will facilitate the estimation of energy availability for a given linear length of ocean over time.

Where wave height is also correlated with wind speed, it can be concluded that wind speeds, wave heights, and wave periods tend to follow the same Weibull statistical distribution as illustrated in FIG. 3, which depicts a distribution of wave heights for corresponding wind speeds as presented in FIG. 1. From this conclusion, energy availability is predictable for given locations.

It will further be noted that the available energy in waves increases to the cube of an incremental increase in wave height. FIG. 5 illustrates wave height in feet on the X axis and the corresponding available power in kilowatts on the Y axis. The chart estimates the energy within a 20-foot wide span of one wave at various heights to simplify the calculations, again assuming a standard water density of 62.4 lbm/ft$^3$. Wave power calculations are based on guidance outlined in the "Engineering and Design Coastal Engineering Manual" Part II describing Linear Wave Theory for Regular Waves, which was published by the Department of the Army, U.S. Army Corps of Engineers. That manual provides detailed calculations of wave power or wave energy flux.

Considering a location at sea 20 feet wide near Station 44008, the wave energy flux available in that space at recorded wave heights and periods as in FIG. 5 based on the percentage of time spent per year at that those energy levels as given in the Weibull distribution of FIG. 3 can be employed to estimate the annual accumulated energy curve for each wave height to develop the data in FIG. 6. It will be noted that high wave heights yield relatively little annual accumulated energy. Although the wave energy flux level, is high for large waves as shown in FIG. 5, the time spent per year at those levels is very low as shown in FIG. 3 such that the total energy accumulation is relatively low.

For example, FIG. 3 demonstrates that, most of the time, waves travel at approximately 8 feet approximately 10.8% of the time in a given year, which equals approximately 39.5 total days. FIG. 4 indicates that 8 foot waves occur every 5.5 seconds thereby yielding approximately 200 Kw per wave period as in FIG. 5. Based on the time spent at this wave height, the total accumulative power produced in a year would be approximately 191 Mw-hrs pursuant to FIG. 6.

Therefore, the total area under the curve in FIG. 6, which equals the total annual available power, for a 20 ft space near Station 44008 equals 6,094 Mw-hrs. Such calculations allow a determination of the return on capital investment that will drive a system to meet the Department of Energy's objective of $2 to $3 per kilogram of Hydrogen produced and to establish the rationale for pursuing this technology as discussed further below.

The absolute available energy in a volume of water can never be completely absorbed by a hydro-generator. Doing so would require that there be no exiting wave from the system. Assuming a system capable of absorbing at least 75% of the available energy in a given wave, however, one can estimate an expected energy production per year of 4.57 MW-hours or more.

In FIG. 7, the solid bars represent the available energy in a 20 foot space located 54 nautical miles southeast of Nantucket as shown in FIG. 5. The cross hatched bars represent the predicted 75% efficiency of the actual system.

In light of the extraordinary amount of energy available in waves, it will be appreciated that a system and method capable of extracting wave energy in an efficient and effective manner would represent a significant advance in the field of clean energy production.

SUMMARY OF THE INVENTION

With an appreciation for the state of the art summarized above, the present inventor set forth with the basic object of providing a system and method for enabling the harvesting of energy from wave oscillation.

Further objects of embodiments of the invention are to provide a system and method for exploiting energy harvested from wave oscillation to generate hydrogen and oxygen through electrolysis and to employ the same as a source of clean energy.

A more particular object of embodiments of the invention is to exploit open water sites, possibly sites beyond view of land, thereby to establish cost effective locations without likely opposition.

An underlying object of embodiments of the invention is to maximize revenue per kilowatt and to maximize kilowatt production per unit.

A more detailed object of embodiments of the invention is to minimize moving parts thereby to create a robust and durable arrangement.

Still other objects of embodiments of the invention are to provide systems and methods for gas storage, gas liquefaction, and transfer and distribution with enhanced communication and control capabilities and minimized operational labor costs.

These and in all likelihood further objects and advantages of the present invention will become obvious not only to one who reviews the present specification and drawings but also to those who have an opportunity to witness embodiments of the wave oscillation power transfer and hydrogen-oxygen generation systems and methods disclosed herein in operation. However, it will be appreciated that, although the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

In carrying forth these objects, a basic embodiment of the present invention for a system for harvesting energy from wave oscillation is founded on an energy harvesting vessel. The energy harvesting vessel can have at least one vessel hull, which may alternatively be referred to as a pontoon, for providing buoyancy to the vessel. A plurality of bobber devices can be retained in relation to the vessel hull with each bobber device having a buoyant float head and a means for retaining the float head for reciprocating movement in response to wave oscillation. The vessel can further include a means for converting the reciprocating movement of the buoyant float heads of the bobber devices to electrical energy thereby enabling energy to be harvested from an oncoming wave.

In certain embodiments, multiple bobber devices can be disposed in series to establish a column of bobber devices. With the bobber devices disposed in a column, energy can be sequentially harvested from an oncoming wave with each succeeding bobber device extracting a further percentage of the total energy available in the wave. To facilitate the ability of the bobber devices to harvest energy, the vessel can include one or more wave channels with an open volume defined by first and second sides for enabling a channeled passage of portions of oncoming waves. In each wave channel, a column of bobber devices can be disposed with the float heads of the bobber devices positioned to reciprocate in the open volume of the wave channel. Embodiments of the vessel can have multiple hulls, and the sides of adjacent hulls can together define a wave channel.

To produce an amplification of the wave height, the wave channels can be tapered in a vertical plane from a lower portion to an upper portion of the wave channels. Furthermore, the vessel hulls can have tapered first and second ends whereby the wave channel defined by the first and second hulls will narrow from a first end thereof toward a mid-portion thereof broaden from the mid-portion thereof toward a second end thereof To produce the wave channels and to define them with the described tapers, the first and second hulls in certain embodiments can be blade shaped in cross section.

The float head of each bobber device can have a buoyant portion sufficient for causing the float head to rise with a rise in water level and a ballast portion sufficient for causing the float head to fall with a lowering in water level. To accommodate differing ocean conditions and to facilitate relocation of the energy harvesting vessel, the weight of the ballast portion of the float head can be rendered adjustable, such as by a means for enabling an addition or subtraction of ballast material.

Each bobber device can further include a piston head disposed within a pump housing with each piston head coupled for reciprocating movement in response to the reciprocating movement of the float head. With this, the bobber devices can operate as hydraulic pumps capable of emitting pressurized fluid. A conversion arrangement, such as a hydraulic engine in combination a generator, in fluidic connection with the bobber devices can receive pressurized fluid from the bobber devices and employ the same to generate electricity.

The vessel can further incorporate an electrolyzer, which can receive electricity generated by the conversion arrangement and which can receive water from a source of water in fluidic communication with the electrolyzer. With this, the bobber devices can produce electricity to power an electrolysis process thereby to enable a separation of water supplied to the electrolyzer into hydrogen and oxygen. The electrolyzer can be a high pressure electrolyzer operative at pressures of 3,000 psi or greater, and, in certain embodiments, the source of water can be a reverse osmosis (RO) water purification system for providing purified water from seawater. Storage containers in fluidic communication with the electrolyzer can enable storage of hydrogen and oxygen produced by the electrolyzer.

A transport vessel for enabling a removal of hydrogen and, possibly, oxygen from the energy harvesting vessel and a transport of the hydrogen and oxygen to a destination. The transport vessel can have at least one vessel hull, a means, such as storage container, for enabling storage of hydrogen and oxygen in relation to the transport vessel, and a means for enabling a transfer of hydrogen and oxygen from the energy harvesting vessel to the transport vessel. The means for enabling a transfer of hydrogen and oxygen from the energy harvesting vessel to the transport vessel can, for example, comprise a conduit arrangement in fluidic association with the storage container of the transport vessel, a conduit arrangement in fluidic association with the storage container of the energy harvesting vessel, and a means for enabling a coupling of the conduit arrangements of the energy harvesting vessel and the transport vessel.

In particular embodiments of the energy harvesting system, the means for enabling a coupling of the conduit arrangements can be a quick connect and disconnect coupling arrangement with a male coupling and a female coupling, similar to those used for air-to-air refueling arrangements for aircraft. Furthermore, embodiments of the invention can employ male and female couplings of the coupling arrangements that are buoyant whereby the couplings could be engaged while floating atop a common water surface.

To resist undesirable movement of the energy harvesting vessel, one or more sea anchors can be fixed to the vessel hull or hulls. One potential sea anchor can be a horizontal movement sea anchor for resisting horizontal movement across a body of water in response to wind and wave forces. The horizontal movement sea anchor, which can be secured adjacent to a bottom of the vessel hull or hulls, can comprise a framework, a plurality of apertures in the framework, and a corresponding plurality of means, such as hingedly coupled doors, for closing the apertures. Where there are multiple vessel hulls, the framework of the horizontal movement sea anchor can be retained substantially perpendicularly to the longitudinal orientation of the first and second vessel hulls thereby to present a force in direct resistance to oncoming wind and wave forces 30. A further sea anchor may comprise a vertical movement sea anchor for resisting vertical movement of the vessel. Such a sea anchor could, for example, comprise a substantially continuous surface fixed to the vessel hull or hulls below the waterline.

To enable a repositioning or other movement of the energy harvesting vessel, one or more propulsion pods can be operably associated with the vessel hull or hull. While the propulsion pods could be powered by any effective arrangement, embodies of the energy harvesting vessel can power the propulsion pods by the energy harvested by the vessel, such as through hydraulic power harvested by the bobber devices, by electricity generated therefrom, or by the hydrogen or oxygen deriving from the electrolysis process.

One will appreciate that the foregoing discussion broadly outlines the more important features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention.

BRIEF DESCRIPTION OF THE DRAWINGS

FIG. 17A is a top plan view of a transport vessel as disclosed herein;

FIG. 17B is a view in front elevation of the transport vessel of FIG. 17A;

FIG. 18A is a top plan view of an energy harvesting vessel coupled with a transport vessel;

FIG. 18B is a top plan view of a coupling arrangement;

FIG. 20 is a chart of drag as a function of vessel length.

DETAILED DESCRIPTION OF PREFERRED EMBODIMENTS

It will be appreciated that the wave energy harvesting and hydrogen-oxygen generation systems and methods disclosed herein are subject to widely varied embodiments. However, to ensure that one skilled in the art will be able to understand and, in appropriate cases, practice the present invention, certain preferred embodiments of the broader invention revealed herein are described below and shown in the accompanying drawing figures. Before any particular embodiment, of the invention is explained in detail, it must be made clear that the following details of construction, descriptions of geometry, and illustrations of inventive concepts are mere examples of the many possible manifestations of the invention.

Figure 8:
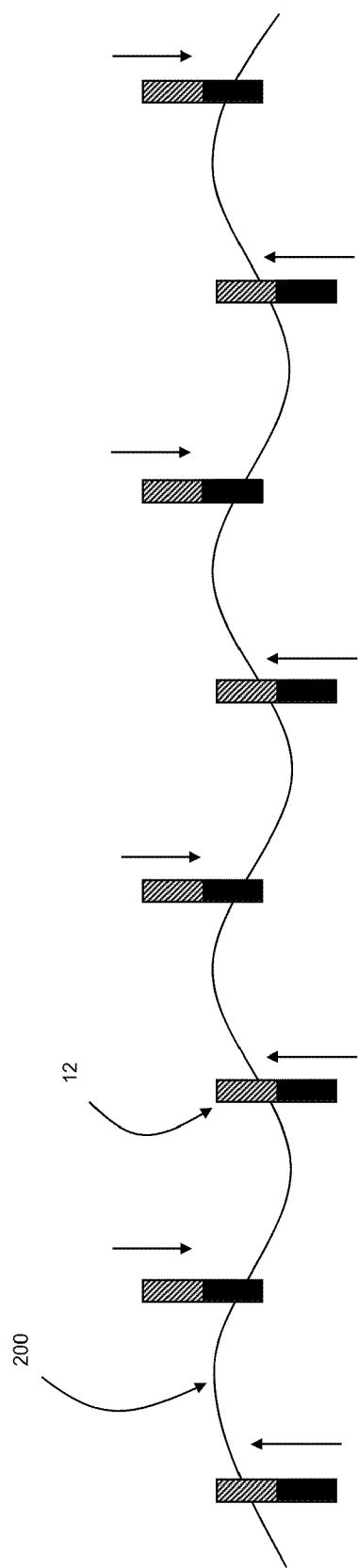
FIG. 8 is a schematic view of a bobber arrangement pursuant to the present invention.

The wave energy conversion concept can be better understood by reference to FIG. 8. There, the vertical action of waves 200 drive a bobber flotation device 12 vertically. The force of the vertical motion can be assumed to be approximately equal to the volume of water displaced by the bobber flotation device 12 multiplied by the specific gravity of water (64.2 $lbf/ft^3$), larger waves 200 will displace more water and will thereby creating greater vertical forces. Those greater vertical forces will yield greater mechanical energy and, ultimately, greater electrical energy for powering an electrolysis process. Similarly, larger bobber flotation devices 12 will yield higher energy production.

Figure 9:
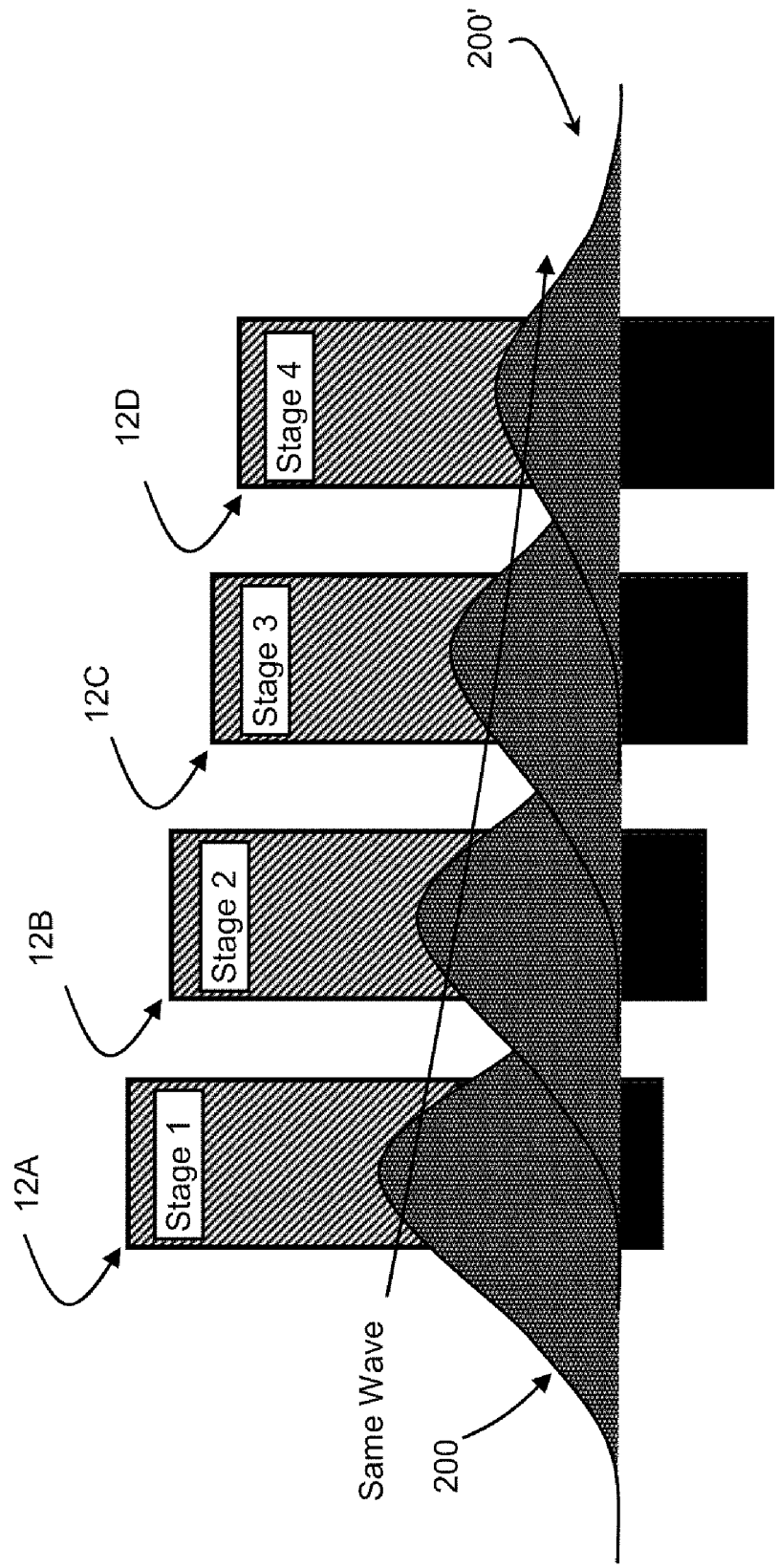
FIG. 9 is a further schematic view of a multi-stage bobber arrangement as disclosed herein.

Since bobber devices 12 pursuant to the invention will extract only a percentage of the total energy present in a given wave 200, substantial energy will be left in the wave 200 as it leaves the bobber device 12. As FIG. 9 shows, multiple bobber devices 12A through 12D can be disposed in succession to improve total system efficiency by extracting as much power as possible from a given wave 200.

In one energy conversion arrangement, it can be assumed that a first bobber device 12A would absorb 30% of the energy within a given wave 200. A second bobber device 12B could be disposed behind the first bobber device 12A to continue to absorb energy from the remaining wave 200, which would have been diminished in amplitude by the energy absorbed by the first bobber device 12A. Assuming the same extraction percentage, the overall energy absorption would be smaller than with the first bobber device 12A since the wave 200 would be diminished in size. Additional bobber devices 12 could be added to continue to extract additional power out of a given wave 200. As FIG. 9 shows, this approach would cause a steady decay in wave height and strength until the exiting wave 200' leaves the system.

Figure 1:
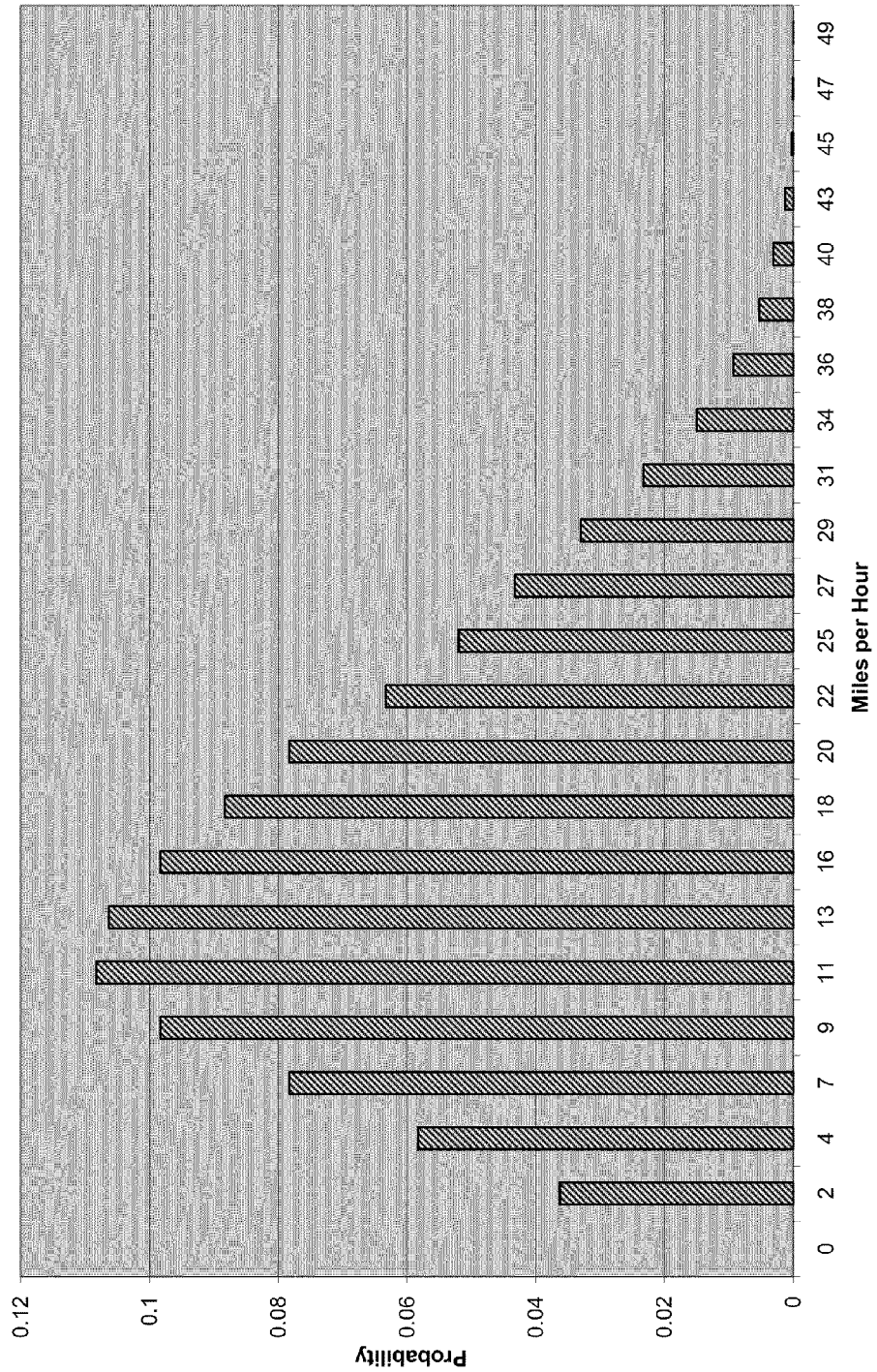
FIG. 1 is a wind speed probability chart.
Figure 2:
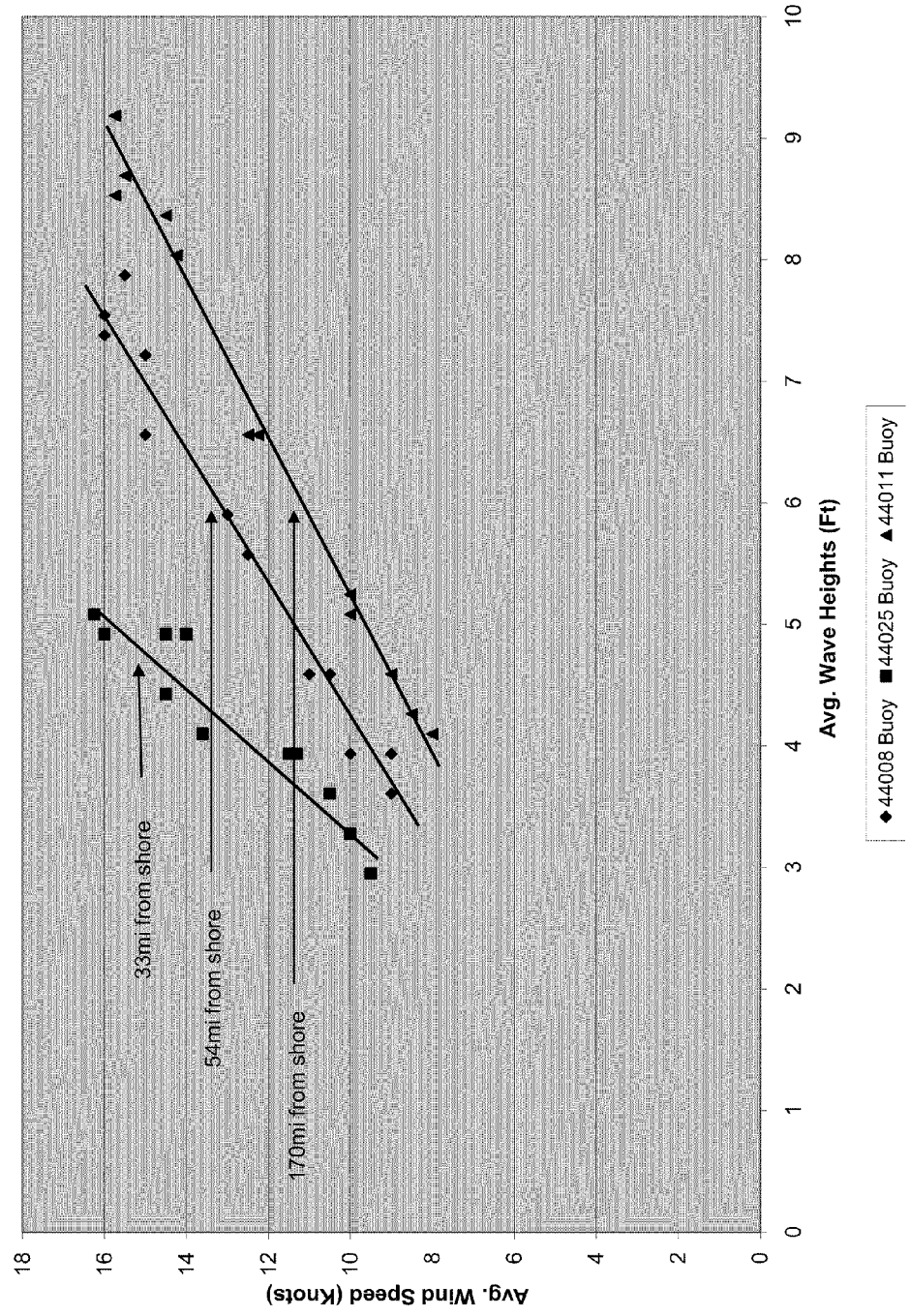
FIG. 2 is a chart of wave height as a function of wind speed.
Figure 3:
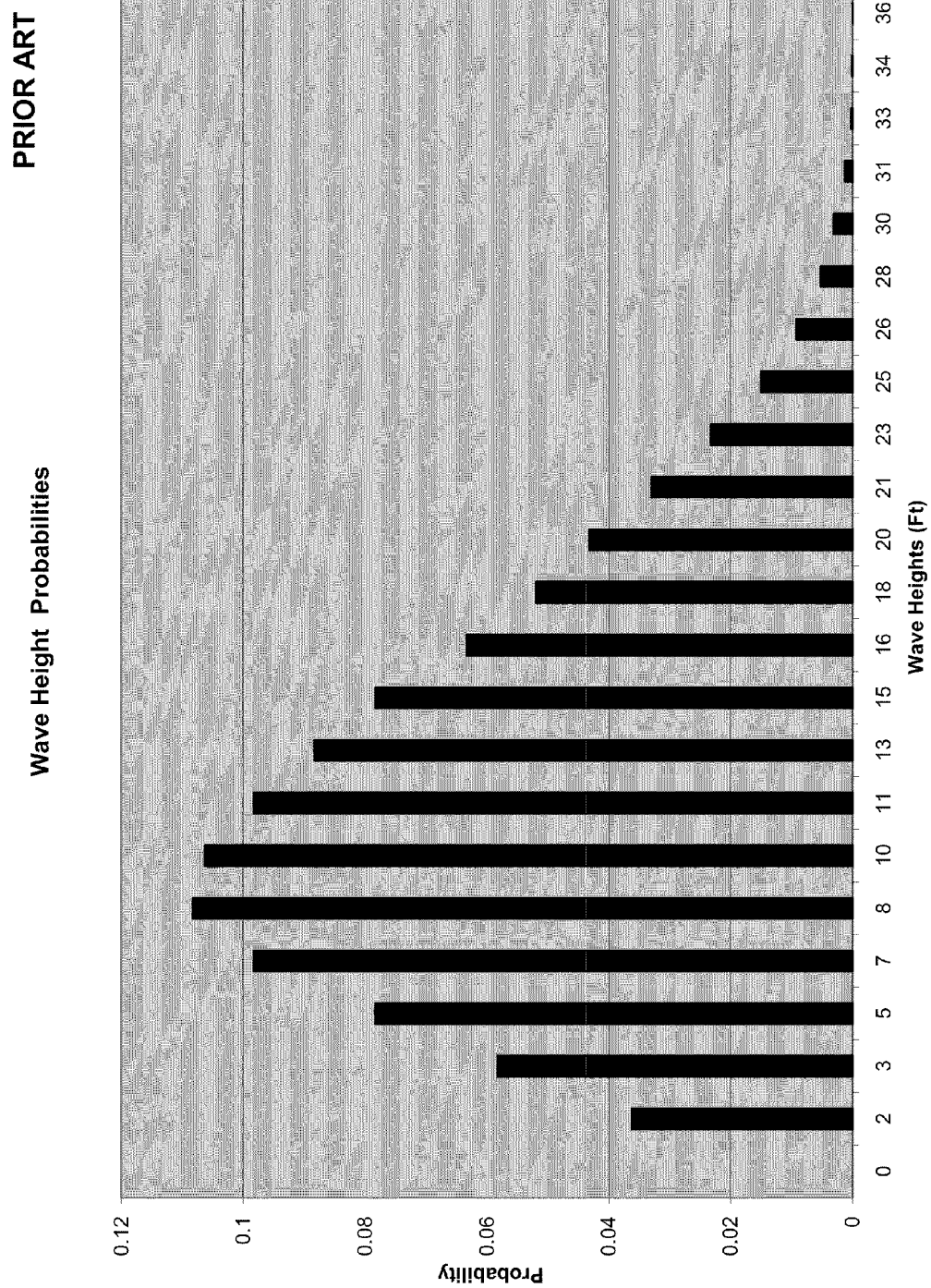
FIG. 3 is a wave height probability chart.
Figure 4:
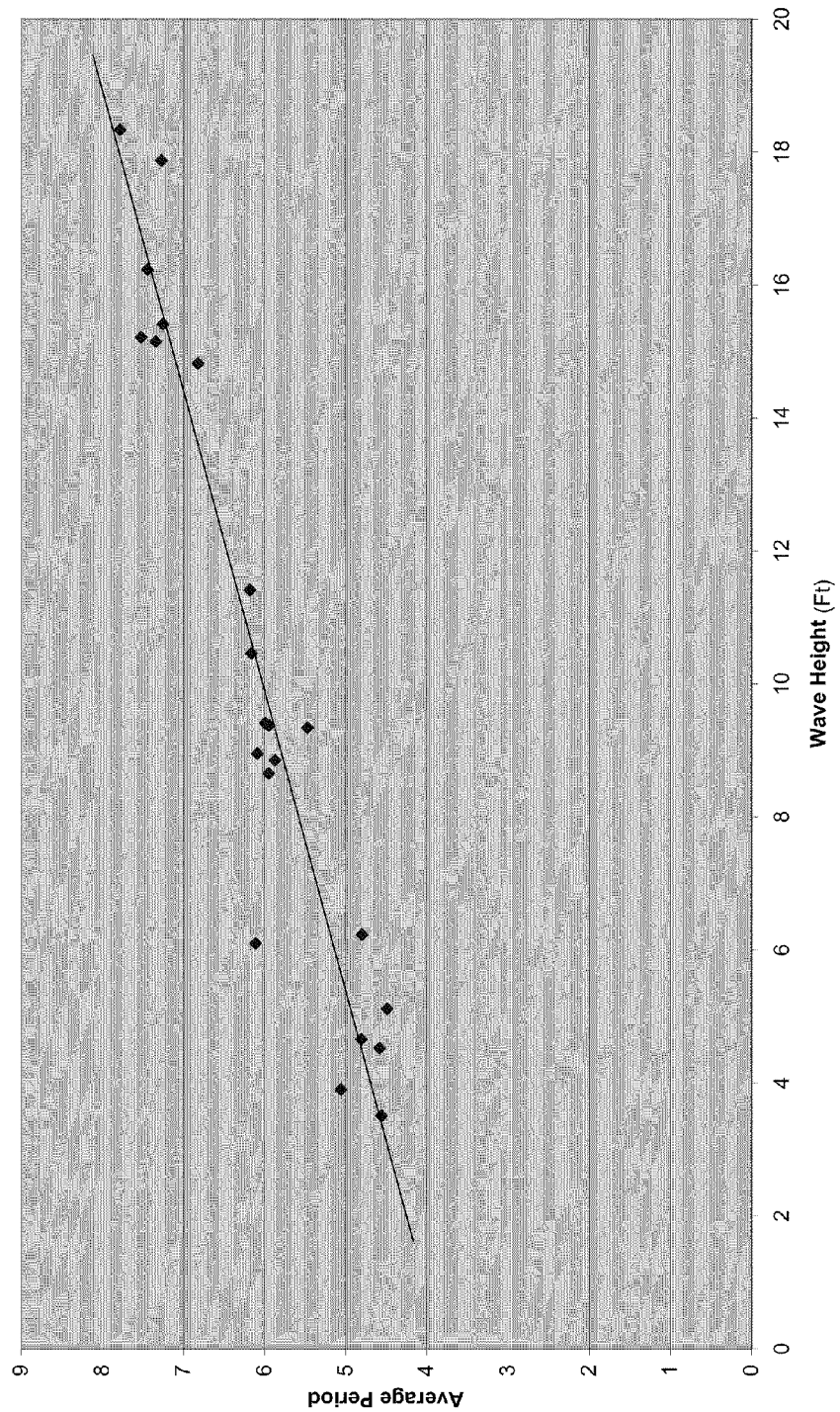
FIG. 4 is a chart of wave height as a function of wave period.
Figure 5:
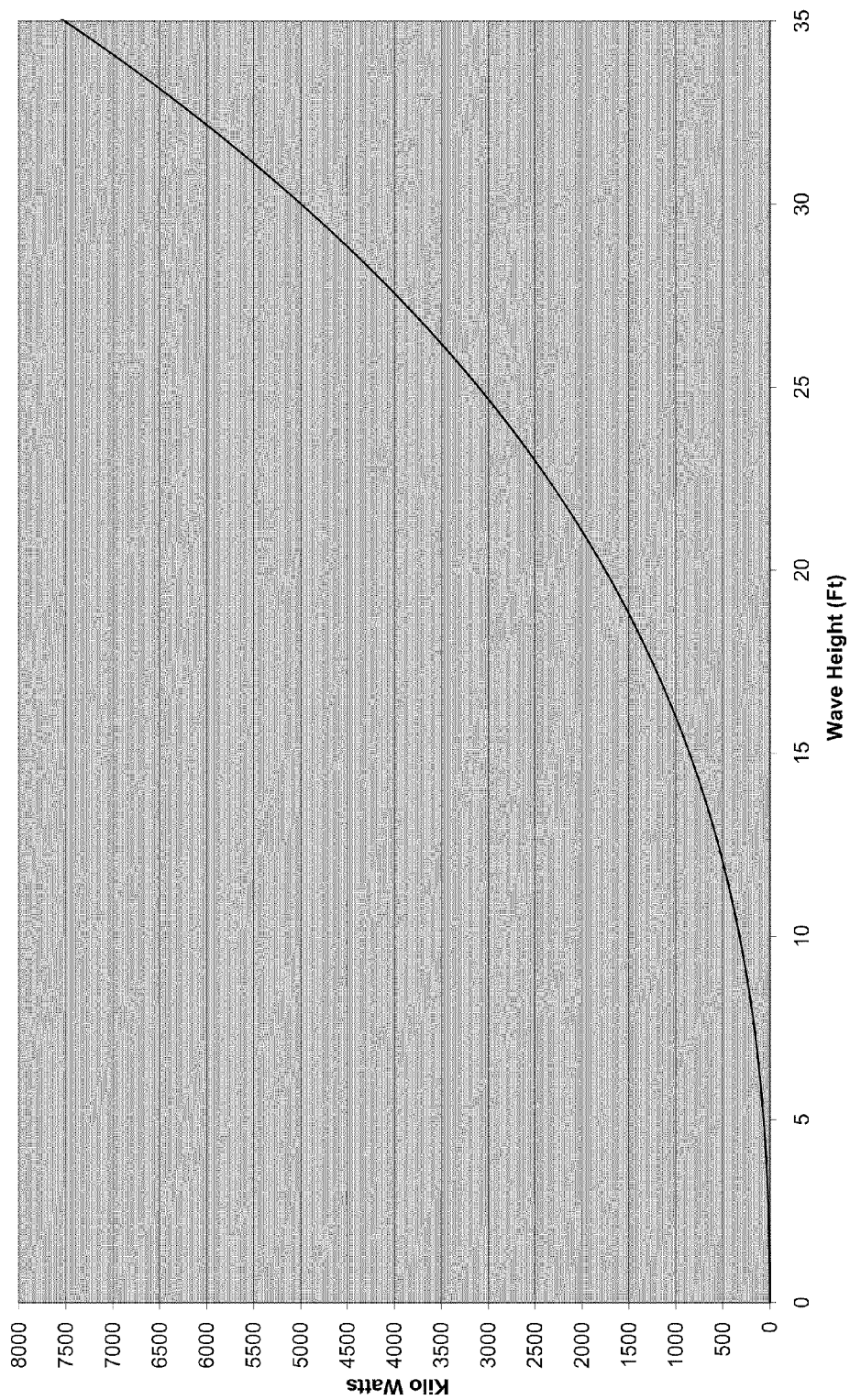
FIG. 5 is a chart of available wave power as a function of wave height.
Figure 6:
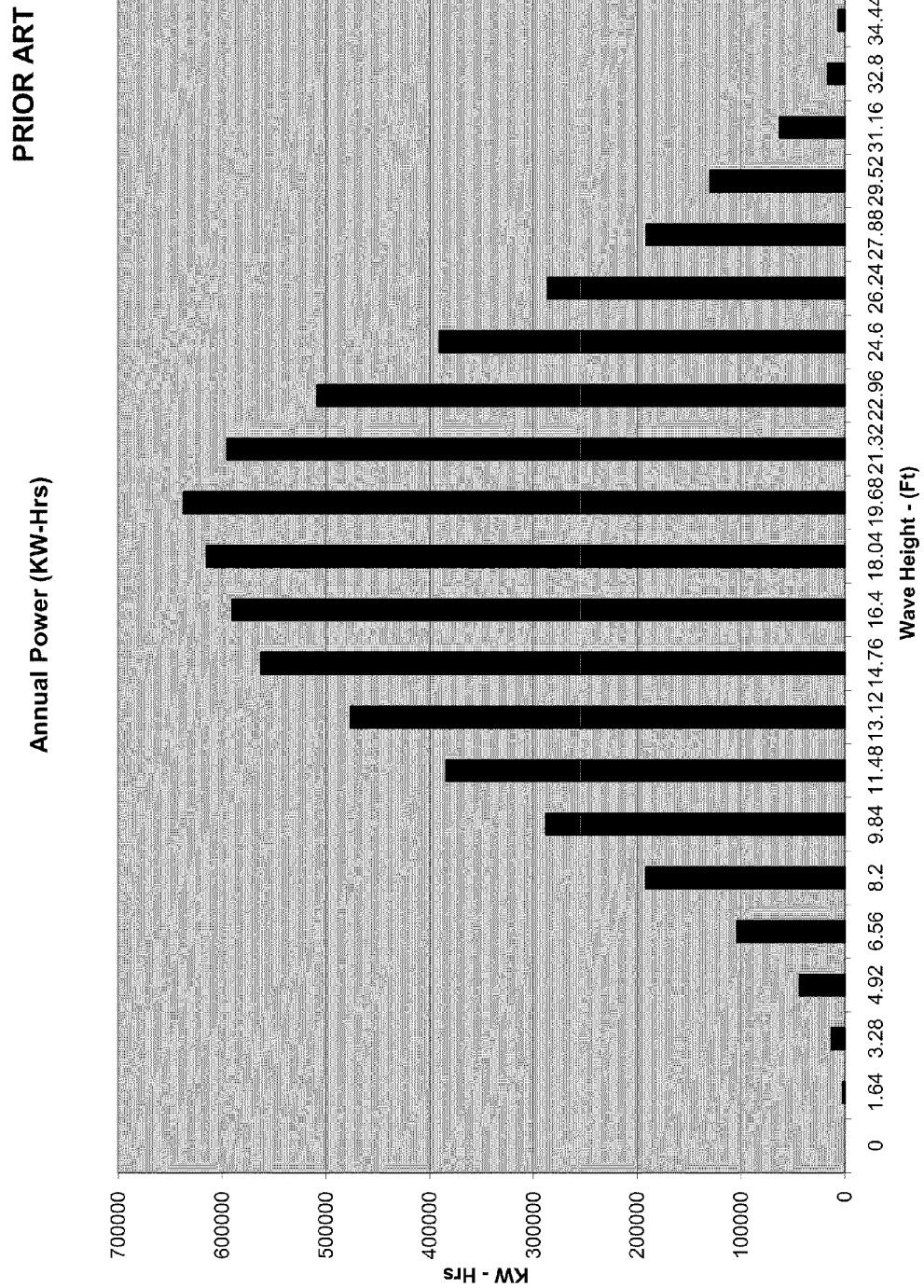
FIG. 6 is a chart of annual power produced as a function of wave height.
Figure 7:
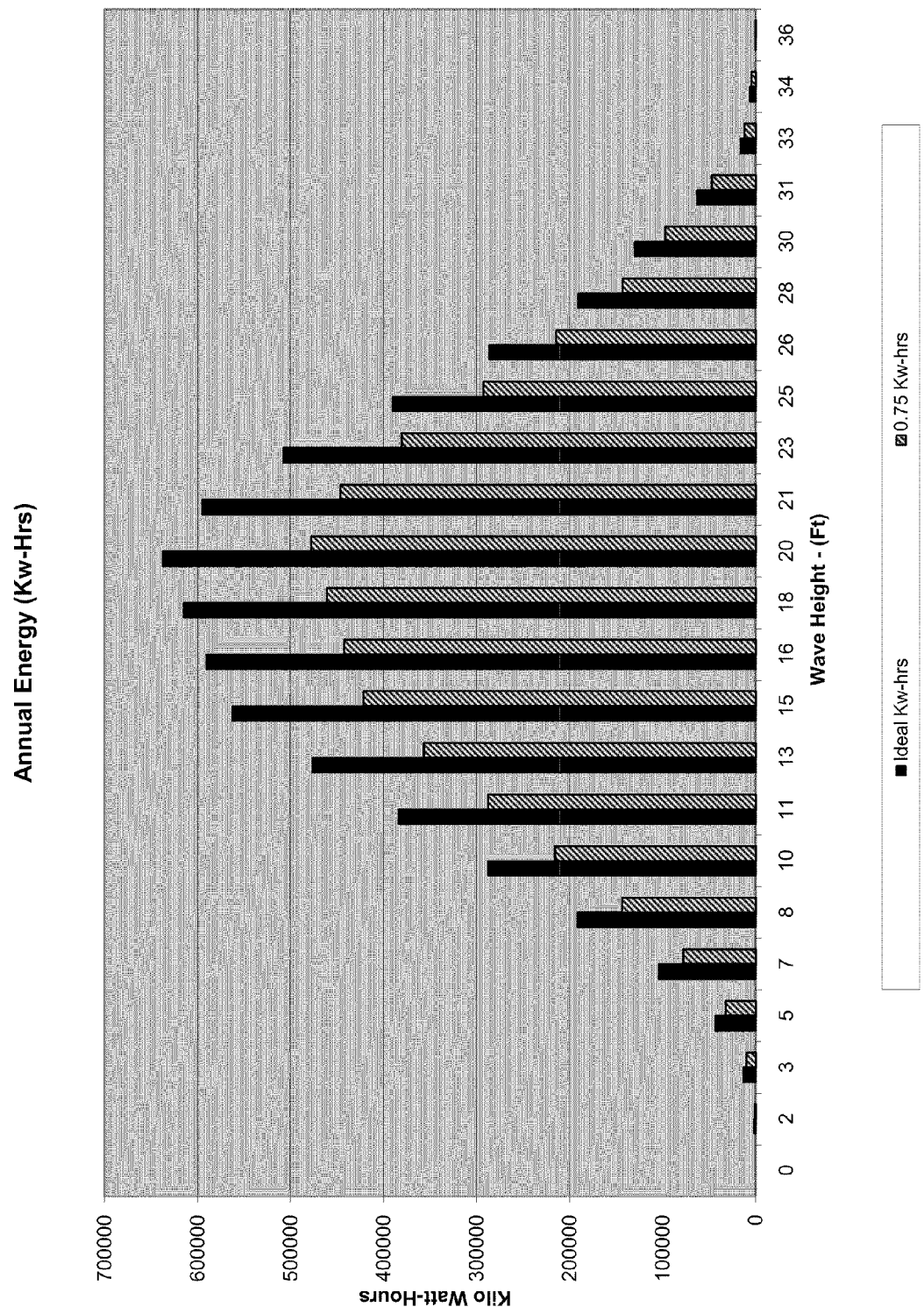
FIG. 7 is a chart of annual energy produced as a function of wave height.

Under such an arrangement, a 20-foot wide section of an 8-foot wave with a 5.5 sec. wave period can be assumed to contain approximately 254 hp of energy. If the first bobber 12A were able to extract 30% of the energy, the wave height and period would change to 6.84 ft at 5.25 sec thereby leaving 177 hp in the wave. In certain practices of the invention, wave height, and period can be calculated through trial and error until a thirty percent reduction is achieved. The slope shown in FIG. 4 can enable an estimation of the relationship between wave heights and wave periods.

If second, third, and fourth stage bobbers 12B, 12C, and 12D were added under the present example, the remaining energy, wave heights, and periods after each bobber can be calculated to be 124 hp, 5.84 ft, 5.04 sec; 87 hp, 4.98 ft, 4.86 sec; 61 hp, 4.24 ft, 4.7 sec, 42.7 hp, 3.6 ft, 4.56 sec, and 29.9 hp, 3.05 ft, 4.44 sec respectively. Under these calculations, the total energy absorption would be approximately 224.1 hp or 88% of the available energy within the wave 200. Therefore, while a bobber device 12 would enable the conversion of substantial energy, multiple stages of bobber devices 12 would convert substantially more of the available energy.

Figure 10:
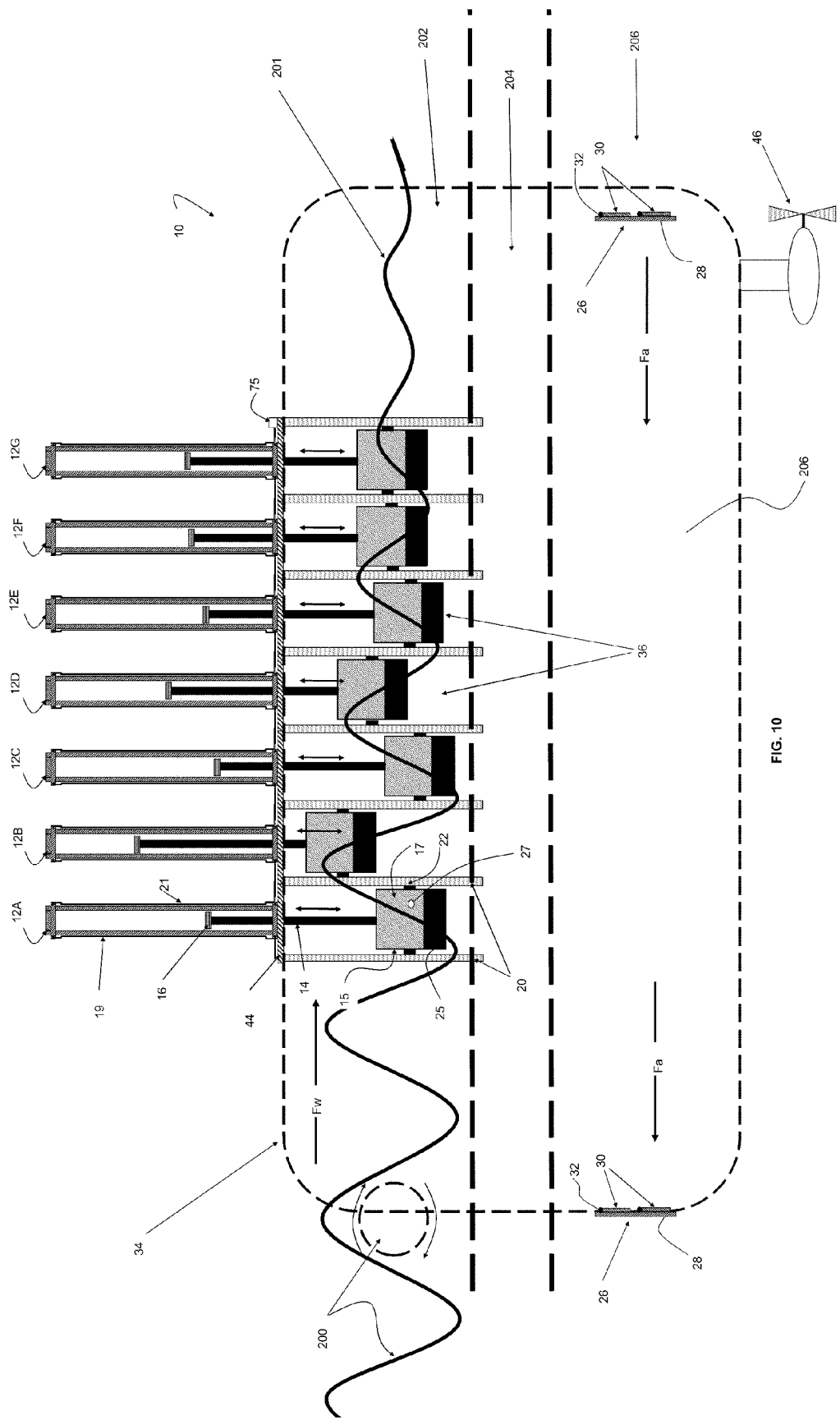
FIG. 10 is a sectioned view in side elevation of an energy harvesting vessel incorporating a multi-stage bobber arrangement pursuant to the instant invention.
Figure 11:
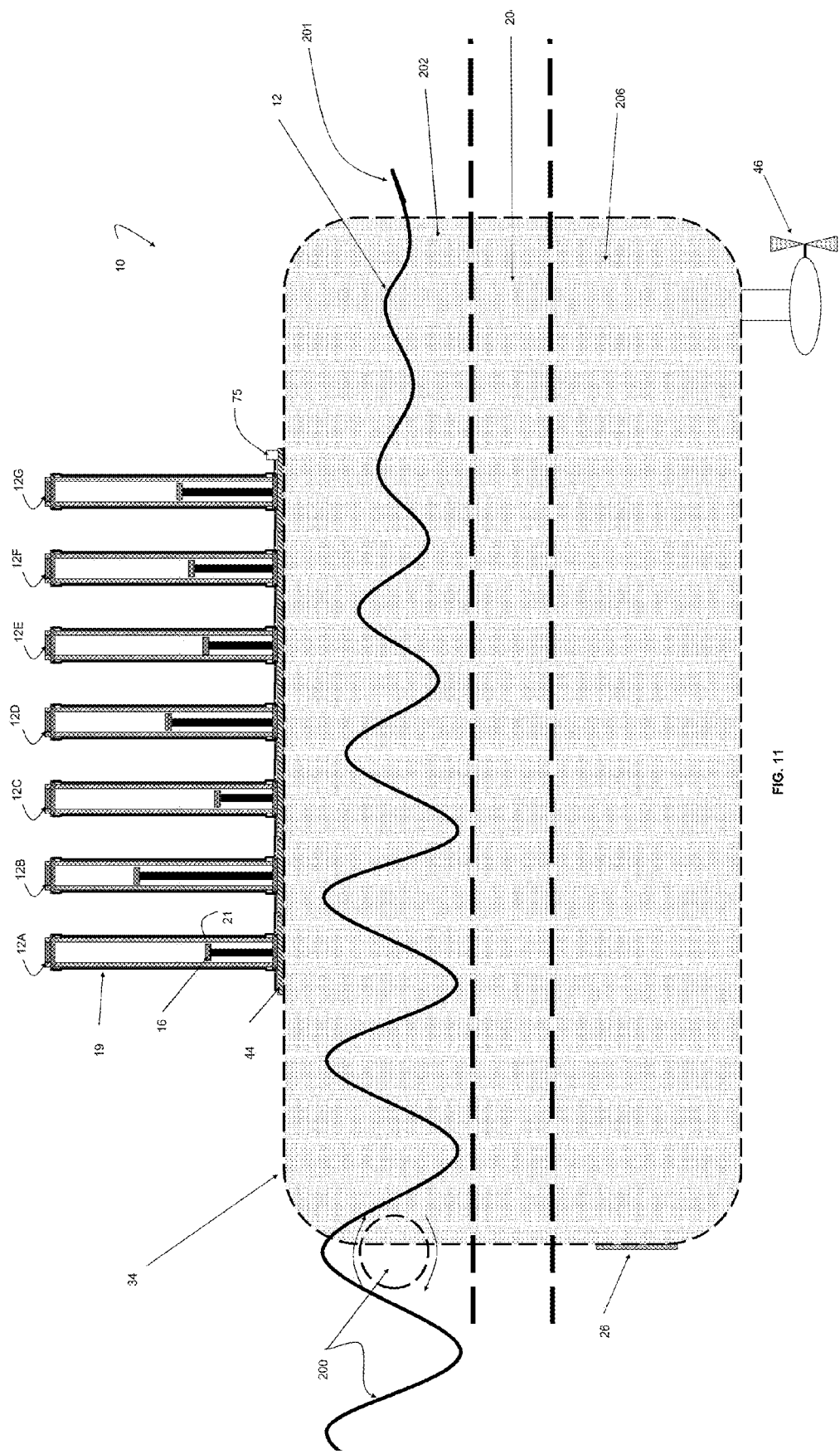
FIG. 11 is a view in side elevation of the vessel of FIG. 10.

In light of the foregoing, multiple rows of bobber devices 12 in series are desirable for optimal energy conversion. To that end, a barge energy harvesting vessel 10, such as that depicted in FIGS. 10, 11, 14, and 15 was developed. The energy harvesting vessel 10 employs multiple rows of bobber devices 12A through 12G to face oncoming waves in series in what can be considered a bobber train as shown in FIGS. 10 and 11 to absorb a greater percentage of available wave energy.

Each bobber device 12A through 12G individually harvests a percent of energy from a given entering wave 200 with each subsequent bobber device 12B through 12G continuing to harvest a further percentage of the energy in the original entering wave 200. The entire bobber train creates "wave decay" removing most of the energy resident in a given entering wave 200 as it passes through the train such that the exiting wave 200' is dimensionally much smaller than the entering wave 200. The ideal series of bobber devices 12A through 12G would result in very little wave action exiting the energy harvesting vessel 10. Each subsequent entering wave 200 is harvested in the same way. The train of bobber devices 12A through 12G is fully flexible to harvest energy from irregular wave heights and periods with the float head 15 of each individual bobber device 12A through 12G moving independently of the others within the same bobber train. In addition, each train of bobber devices 12A through 12G moves and harvests energy independent of the other trains thereby maximizing system flexibility to harvest energy from irregular wave heights and periods on a "real time" basis.

The total energy extracted from a given incoming wave 200 is the aggregate of the energy extracted by each of the bobber devices 12A through 12G inline harvesting energy. It will be appreciated that removing all energy from a given wave 200, thereby entirely eliminating any exiting wave 200', would be difficult or impossible. However, the greater the number of bobber devices 12 existing inline and the closer they are disposed offers a greater opportunity to harvest greater percentages of energy per wave 200. However, more bobber devices 12 demands more capital dollars invested per energy harvesting vessel 10 due to, among other things, a greater concentration of mechanics per square foot of energy harvesting vessel 10. The optimum configuration of bobber devices 12 may be determined based on experimentation and dependent on specific sea conditions.

The energy harvesting vessel 10 also employs multiple columns of bobber devices $12A_1$ through $12A_{10}$ in rows in corresponding wave channels 36 for presenting a wider face thereby drastically increasing the effective width of oncoming waves 200 that can be absorbed. By absorbing a wider portion of the oncoming wave, the economies of scale of the energy harvesting vessel 10 are improved. In certain embodiments, columns of bobber devices 12 can be disposed side by side along hundreds of feet along the length of an energy harvesting vessel 10 for large scale energy absorption.

Figure 12:
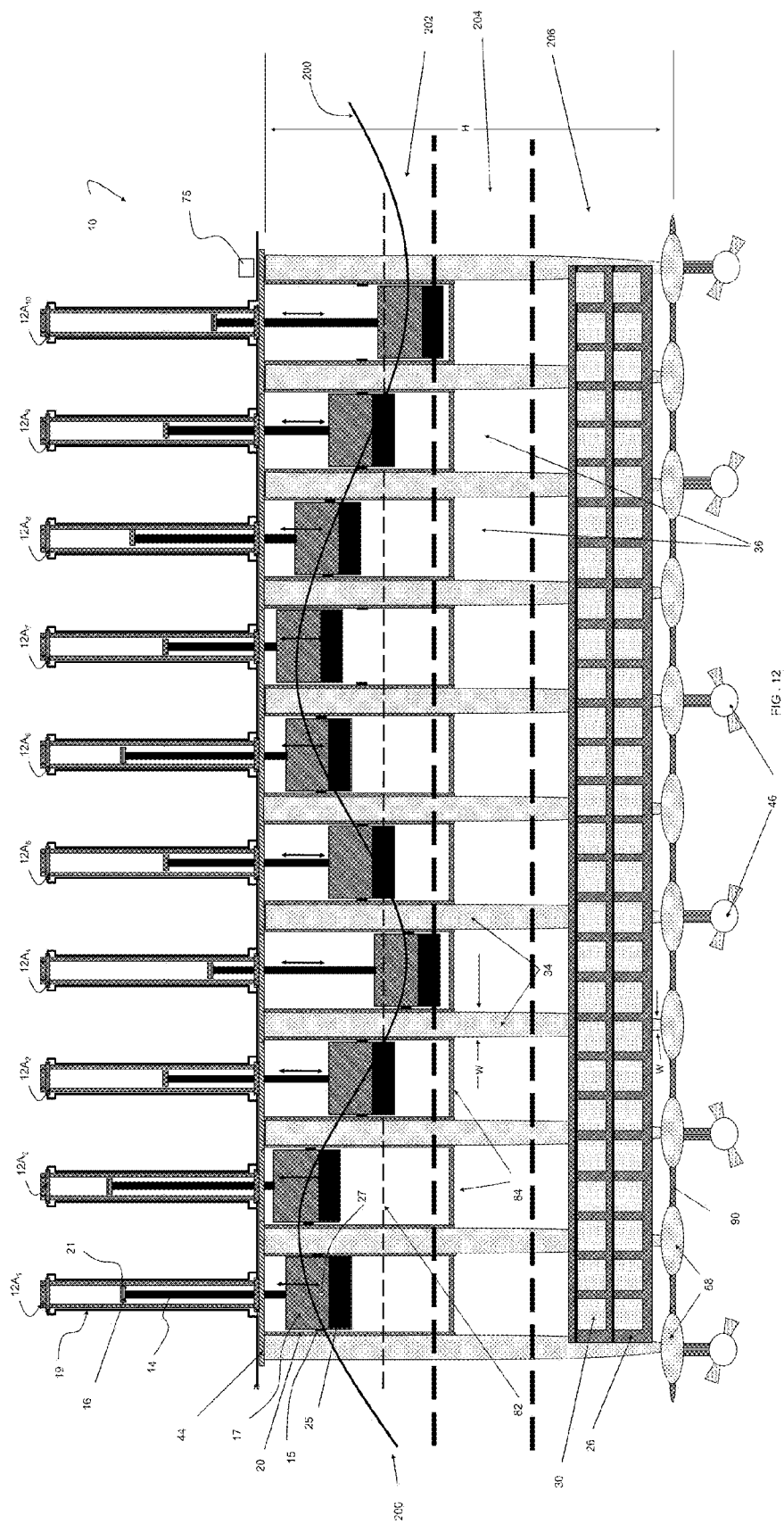
FIG. 12 is a sectioned view in side elevation of an alternative energy harvesting vessel pursuant to the invention disclosed herein.

As can be perceived by combined reference to FIGS. 11 and 12, the energy harvesting vessel 10 employs a plurality of pontoons 34, which may alternatively be referred to as vessel hulls, for providing buoyancy and stability for the vessel over its width and length. The pontoons 34 in the depicted embodiment are generally rectangular in profile, blade-shaped in cross section along their mid-portions, and pointed at their first and second ends. The pontoons 34 are disposed in a parallel arrangement and in alignment with the columns of bobber devices $12A_1$ through $12A_{10}$. The pontoons 34 support the bobber devices 12 and displace sufficient water to make the vessel 10 buoyant. The pontoons 34 in this example extend forward and rearward of the rows of bobber devices 12A through 12G thereby to provide longitudinal stability to the energy harvesting vessel 10. Pontoons 34 are disposed outboard of the outermost bobber devices $12A_1$ through $12A_{10}$ thereby to provide lateral stability to the energy harvesting vessel 10.

With their blade-shaped cross section, the pontoons 34 tend to place themselves and, thus, the energy harvesting vessel 10 in alignment with the direction of oncoming waves. The blade-shaped cross-sections and pointed ends of the pontoons 34 cause adjacent pontoons 34 to together form a tapered wave channel 36 therebetween that amplifies wave heights and maximizes the opportunity for energy harvesting.

With each column of bobber devices $12A_1$ through $12A_{10}$ disposed between adjacent pontoons 34, the wave channels 36 also function as oscillation spaces for the respective columns of bobber devices $12A_1$ through $12A_{10}$ thereby to allow the reciprocating movement of the float heads 15 and the remaining oscillating components of the bobber devices $12A_1$ through $12A_{10}$. The pontoons 34 are formed to cause the water line to fall at approximately one-half the height H of the pontoons 34.

Since volume is occupied by the pontoons 34 and since water is not compressible, the wave channels 36 are expected to maximize the height of incoming waves 200. This is at least partially dependent on the assumption that the period will remain substantially the same. Water displacement forces the crest of the incoming wave 200 up and the trough down thereby exaggerating the vertical range that the float head 15 while riding over the surface of the wave 200. The wave channels 36 in this embodiment are slightly tapered in the vertical plane to contribute to the amplification of wave heights. The tapered ends of the pontoons 34 establish wave channel entrance and exit portions that are intended to minimize any interruption to the progress of the incoming waves 200 and to minimize the horizontal forces and friction experienced by the energy harvesting vessel 10.

Exaggerating wave heights can render the energy harvesting vessel 10 more efficient by extracting more energy per bobber device 12 per wave. The farther and faster a float head 15 travels within a period, the more energy is transferred. Although a series of bobber devices 12A through 12G are in-line to maximize energy harvesting, wave height exaggeration is believed to maximize the amount of energy extraction per bobber device 12 further to increase the percent of total energy extraction from the incoming wave 200.

The configuration of the pontoons 34, including in relation to their height H, width W, shape, and distance therebetween, can be based on the expected wave conditions in which the energy harvesting vessel 10 will operate. For example, higher annual wave activity in an operating area will demand a higher wave channel 36, and the pontoons 34 can be calibrated to provide sufficiently sized wave channels 36. Calculation and experimentation can enable further refinement of pontoon 34 size and configuration to optimize vessel stability and to maximize wave exaggeration. Ideally, the pontoons 34 will maximize wave height without imposing undue friction losses on incoming waves 200.

As shown in FIG. 12, pontoon connection braces 84 can have first and second ends fixed to adjacent pontoons 34 and a body portion spanning therebetween. The connection braces 84 prevent relative movement and warping of the pontoons 34 as incoming waves 200 pass through the wave channels 36. The connection braces 84 also provide added stability to the bobber devices 12 and the energy harvesting vessel 10 in general.

Under this construction, the energy harvesting vessel 10 can harvest, energy from incoming waves 200 by transferring vertical forces existing in the waves 200 to the bobber devices 12. With further reference to FIGS. 10 and 12, the bobber devices 12 can be founded on a float head 15 that has a buoyant portion 17 and a ballast portion 25. The buoyant portion 17 can be foam, a volume of air, or any other material sufficiently less dense than water to cause the float head 15 to rise in response to an incoming wave 200 as the float head 15 displaces water and a vertical force is exerted by the rise in water level. Resistance to the upward movement of the float head 15 will cause the float head 15 to dip lower in the rising water thereby displacing a greater volume of water and creating an even greater upward force and even greater mechanical energy and work.

The ballast portion 25 can be of any suitable material and construction sufficient to cause the float head 15 to descend toward its lowered disposition in the absence of water sufficient to drive the float head 15 upwardly. As such, the ballast portion 25 could be a volume of sand, metal, water, or any other sufficiently dense material or combination thereof. During a downward stroke, the ballast portion 25 within the float head 15 pulls the float head 15 downwardly as the wave dips below the buoyancy line of the float head 15 when progressing to its trough. Since the float head 15 is in direct contact with seawater, it can be formed form corrosion resistant material.

The weight of the ballast portion 25 within the float head 15 can be adjustable, such as by providing a mechanism to add or subtract from the volume of retained ballast, whether it be water, sand, or any other material. Any suitable means could be provided, including, by way of example, a selectively operable aperture 27 in the float head 15, a pump (not shown), or any other effective construction. In certain practices of the invention, the volume of ballast can be adjusted to ensure an even force for both the up and down strokes. In addition, draining ballast from the float head 15 is advantageous in that it can allow the float head 15 to lift or be lifted out of the water, such as by hydraulics, for ease of movement and transport of the energy harvesting vessel 10.

The float head 15 will displace a certain amount of water at rest to compensate for its own weight. One can assume that the volume of air in the float head 15 will provide displacement to generate to sufficient upward force while the volume of the ballast portion 25 will create sufficient downward force to cause the float head 15 to fall as the surrounding water level drops. In this regard, it will be noted that waves tend to roll as they progress along a water surface. Water molecules move in a circular motion, and very little energy is lost in a wave as it travels across the ocean unless it breaks or it comes in contact with another wave or object, such as a ship. Energy present in waves is a function of their height and period.

Figure 15:
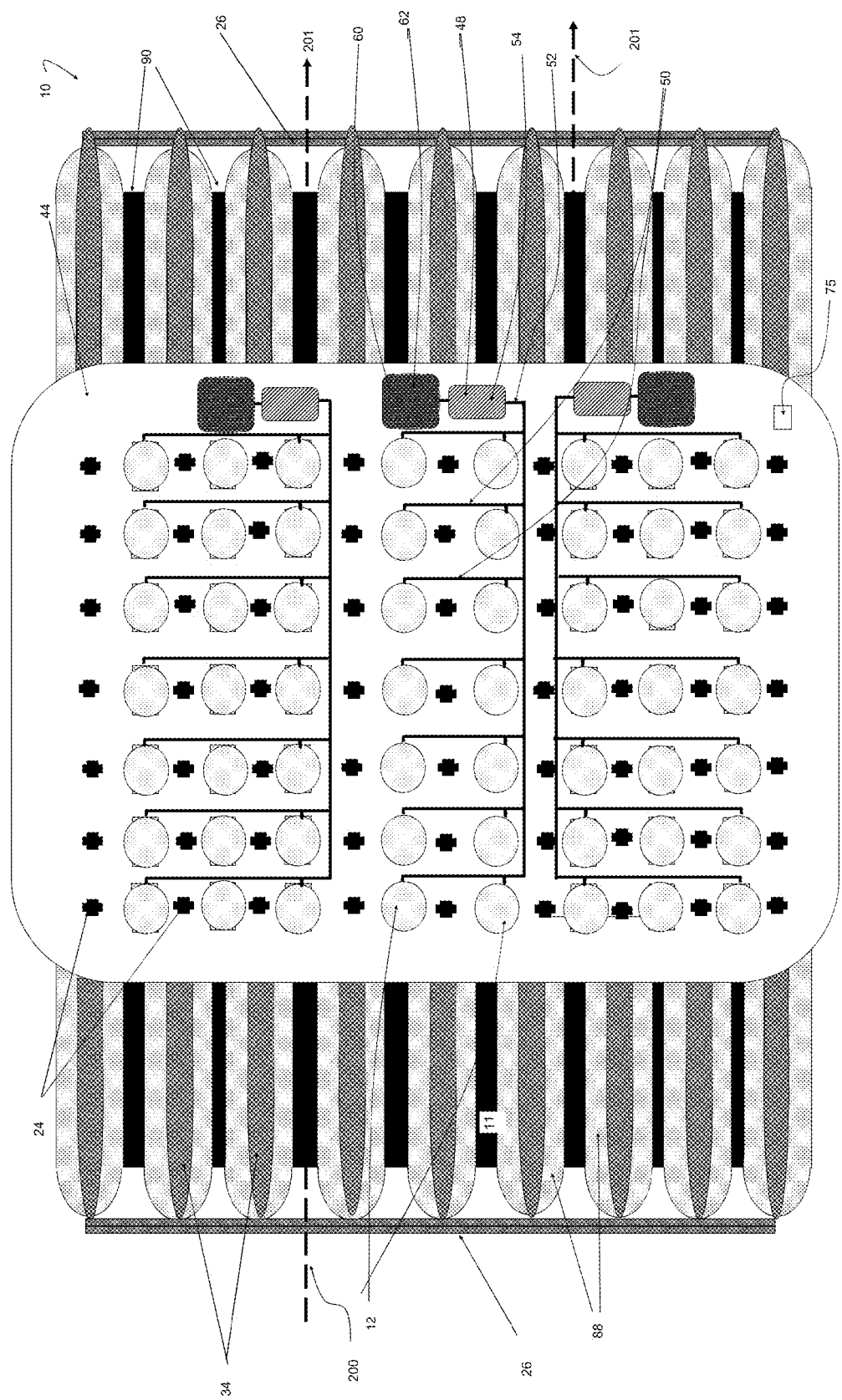
FIG. 15 is a top plan view of the vessel of FIG. 14.

The float head 15 of each bobber device 12 can ride on tracks 20 to enable a controlled linear reciprocation of the float head 15. Bearing surfaces 22, whether in the form of roller bearings or low friction sliding surfaces, can be disposed along the tracks 20 to enable a smooth and low-friction movement of the float head 15. The tracks 20 and the bearing surfaces 22 will preferably be formed from corrosion resistant material. As FIG. 15 shows, bobber posts 24 can be disposed vertically along the sides of the bobber devices 12.

A piston rod 14 has a first end fixed to an upper end of the float head 15 and a second end fixed to a piston 16. Under this arrangement, reciprocating movement of the float head 15 imparts reciprocating movement to the piston 16. The piston 16 is disposed within a correspondingly shaped pump housing 19. O-rings 21 or other means can be provided for ensuring a fluidic seal between the piston 16 and the pump housing 19 thereby preventing leakage and maximizing pumping efficiency. So arranged, the float head 15, the piston 16, the pump housing 19, and the remaining components of the bobber devices 12 cooperate to enable each bobber device 12 to act as a hydraulic pump.

Figure 13:
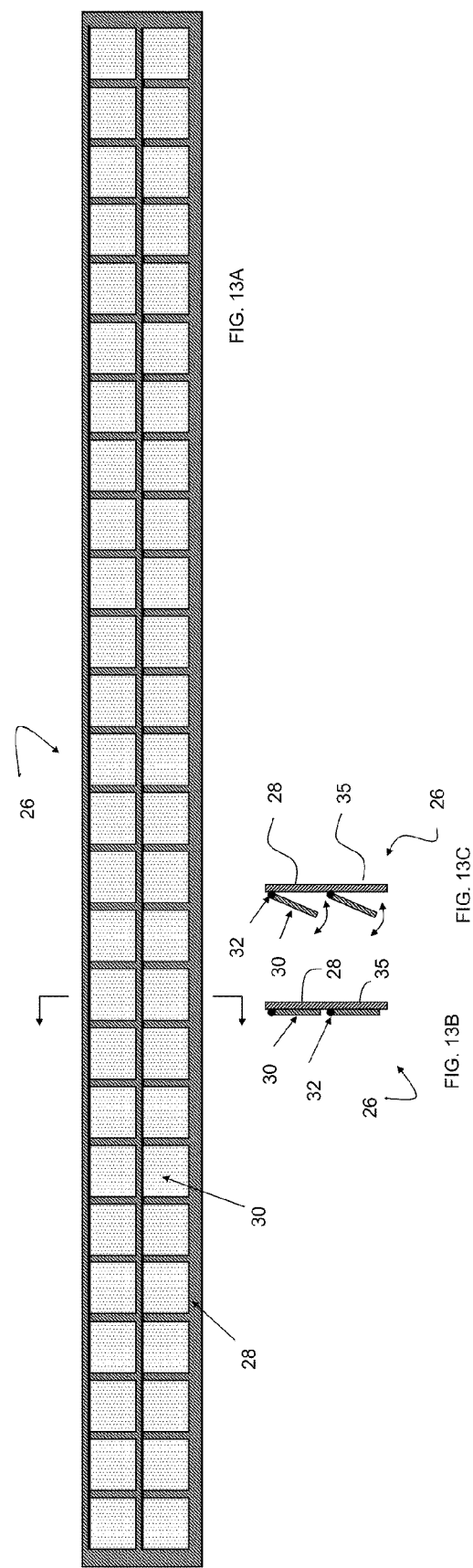
FIG. 13A is a view in front elevation of a sea anchor arrangement under the present invention.
FIG. 13B is a view in side elevation of the sea anchor arrangement of FIG. 13A is a closed configuration.
FIG. 13C is a view in side elevation of the sea anchor arrangement of FIG. 13A is an open configuration.

The energy harvesting vessel 10 can also incorporate horizontal movement sea anchors 26 as shown, for example, in relation to the energy harvesting vessel of FIGS. 10 through 12, 14, and 15. A horizontal movement sea anchor 26 is shown alone in FIGS. 13A through 13C. A horizontal movement sea anchor 26 can be disposed adjacent to or beyond each of the first and second ends of the pontoons 34.

The sea anchors 26 can be founded on a framework 28 that can comprise a flat panel or other structure with a plurality of apertures 35 disposed therein. As can be best perceived from FIGS. 14 and 15, the frameworks 28 of the sea anchors 26 can be disposed generally perpendicularly to a longitudinal of the pontoons 34 and vertically when the energy harvesting vessel 10 is in a fully upright disposition. A plurality of selectively operable doors 30, which can alternatively be termed swing valves 30, can be coupled to the frameworks 28 in relation to the corresponding plurality of apertures 35 in the frameworks 28. The doors or swing valves 30 can pivot about hinges 32, which in this case are horizontally disposed, thereby to enable a selective sealing of the plurality of apertures 35 by a closing of the doors or swing valves 30.

The sea anchors 26 may be disposed well below the waterline and should be deep enough in the water so that oncoming waves 200 have limited effect on the energy harvesting vessel 10. In this regard, the volume of water can be considered to have three water depths: an active zone 202, a transition zone 204, and a dead zone 206. The active zone 202 is the water depth where an incoming wave 200 has its greatest effect. At and near the water surface, the active zone 202 is where bobber devices 12 interact with the sea to harvest wave energy. The transition zone 204 is between the active zone 14 and the dead zone 16 and is not preferred for energy harvesting or vessel anchoring. However, the dead zone 206 is located well below the active zone 202 where very little water movement occurs as a result of passing waves 200. Therefore, the dead zone 206, the depth of which varies with sea conditions, is the ideal depth to place the sea anchors 26. The height H of the pontoons 34 can be calibrated to place the sea anchor 26 at that preferred depth within the dead zone 206.

Since the dead zone 206 experiences little movement, the sea anchors 26 with the doors 30 in a closed position exhibit maximum drag force $F_A$ against the force $F_w$ of incoming waves 200 and winds that interact with the bobber devices 12, the pontoons 34, and the remainder of the vessel 10 to tend to push the energy harvesting vessel 10 in the direction of the moving sea and wind. It will be noted that, if a sea anchor 26 were alternatively placed in the active zone 202, the movement of surface water would interact with the sea anchor 26 to push and tug on the vessel 10. The sea anchors 26 would themselves absorb energy from the waves 200 and cause undesirable movement of the vessel 10. Disposing the sea anchors 26 in the dead zone 206 eliminates this interference and maximizes wave harvesting and drift resistance. With this, where the vessel 10 will seek to operate in a predetermined zone as discussed further below, the sea anchors 26 minimize the need for repositioning the vessel 10 within that operating zone.

While it is normally desirable to minimize the drift of the energy harvesting vessel 10 while wave energy is being harvested, it is alternatively desirable to enable the vessel 10 to be moved, such as for repositioning to return to a desired location, to redeploy to a new operating zone, or otherwise. For example, despite the resistance to movement provided by the sea anchors 26, the energy harvesting vessel 100 will inevitably slowly drift in the direction of the force $F_w$ imparted by the wind and waves. As one can perceive from FIGS. 13A through 13C, the doors 30 can be allowed to pivot to an open disposition to minimize the resistance presented by the sea anchors 26. With the doors 30 pivoted to an open position, the vessel 10 can undergo efficient movement under power by propulsion pods 46, which can include electric motors or other power means and propellers, as shown in FIG. 12. Power for the propulsion pods 46, whether in the form of electricity, hydrogen, or oxygen, can come directly from the energy harvested by the vessel 10.

The doors 30 can be pivoted to a closed disposition once the desired movement is complete. Under a most simple arrangement, the doors 30 can be freely pivoting and disposed to a first side of the framework 28. With this, when the vessel 10 is disposed with the doors 30 facing away from the incident force $F_w$ of the wind and waves and the propulsion pods 46 not operating, the doors 30 will tend to remain closed and will present maximum force $F_A$ in resistance to movement in what can be considered a backward movement of the vessel 10. However, when the vessel 10 is propelled by the propulsion pods 46 in a direction generally opposite the first side of the framework 28 in what can be considered a forward direction of the vessel 10, the doors 30 will tend to pivot to an open configuration thereby allowing water to flow freely through the apertures 35 and allowing most efficient movement of the vessel 10. However, in certain embodiments, the position of the doors 30 can be automatically dependent on the operation of the propulsion pods 46. For example, the doors 30 can be automatically closed, such as by hydraulics, when the propulsion pods 46 are not running, and the doors 30 can be automatically opened when the propulsion pods 46 are under power.

While movement of the energy harvesting vessel 10 in the horizontal direction can be selectively minimized by the horizontal movement sea anchors 26, a vertical movement sea anchor 90 can be employed to dampen undesirable vertical movement of the vessel 10. As FIG. 12 shows, the vertical movement sea anchor 90 can comprise a continuous or generally continuous surface fixed to the pontoons 34, such as to the bases of the pontoons 34. The vertical movement sea anchor 90 can traverse from adjacent to a first end of the pontoons 34 to adjacent to a second end of the pontoons 34 and can span from side to side across the energy harvesting vessel 10.

As fixed to the bases of the pontoons 34, the vertical movement sea anchor 90 can be disposed below the transition zone 204 and within what has been termed herein the dead zone 206. With this, the sea anchor 90 is located well below the surface of the water and well below wave troughs where there is minimal vertical or cyclic water movement. With such a vertical movement sea anchor 90, the vessel 10 can harvest energy from incoming waves 200 while the pontoons 34, the platform 44, and the remainder of the vessel 10 remain vertically stable and while the float heads 15 of the bobber devices 12 travel up and down. It will be noted that the platform 44 provides structural integrity for the vessel 10, a support surface for distribution lines 50, and a place to conduct maintenance for the vessel 10. The bobber devices 12 and a substantial portion of the pontoons 34 are hidden while the ends of the pontoons 34 that extend past the platform 44 are visible.

A plurality of ballast modules 88 can additionally be attached to the bottom of the pontoons 34 to lower the center of gravity 82 of the vessel 10 as shown in FIG. 12 and to provide stability to the vessel 10. As FIG. 12 shows, the ballast modules 88 can be incorporated into the vertical movement sea anchor 90, such as by comprising bulbs of elliptical cross section and by having panels connect the same to form the sea anchor 90. The higher the waves, the greater the need for added stability. Hydrodynamically shaped, the ballast modules 88 present minimal resistance in the water when the vessel 10. The modules 88 can comprise solid members or shells containing sand, lead, or any other ballast material.

Vessel operation is intended to remain within a small operating zone at sea as it harvests energy from waves. Over time, wind and waves will push the vessel 10 in the direction of the wind and sea. As the vessel 10 slips through the water, the location of the vessel 10 can be tracked through a global positioning unit 75. A relatively small operating area can be pre-established. When the vessel 10 drifts outside of that area, the onboard propulsion pods 46 can automatically reposition the vessel 10 within the area using well established global positioning sensing and positioning technology. The propulsion pods 46 can thus periodically cycle on and off to maintain the position of the vessel 10 Inside the desired operating area. The pods 46 can be rotatably mounted to provide gross and fine positioning capability.

Where a major location adjustment is necessary, such as to move the vessel 10 out of the path of a harsh storm or to accommodate seasonal changes, the vessel 10 can be moved most efficiently with the doors 30 of the sea anchor 26 opened and with the pontoons 34 longitudinally aligned with the direction of desired movement. As noted previously, the propulsion pods 36 can be driven by an electric motor, by a hydrogen powered engine, or by any other effective means, which can potentially be powered by electricity, by hydrogen, or by oxygen generated by the vessel 10 itself, thereby enabling movement over extended distances without external fuel supplies.

Figure 14:
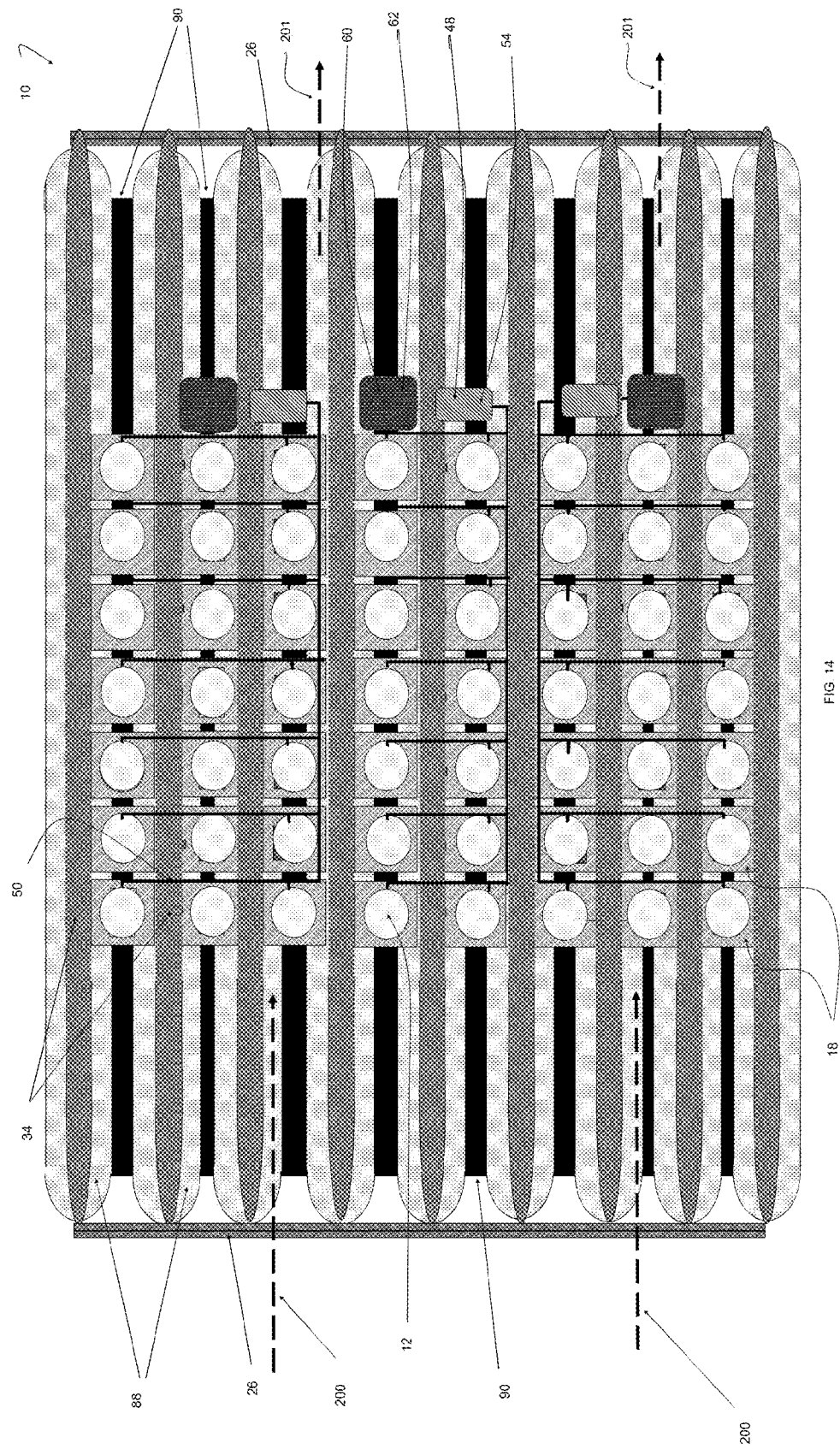
FIG. 14 is a sectioned top plan view of a vessel incorporating a multi-stage bobber arrangement as taught herein.
Figure 16:
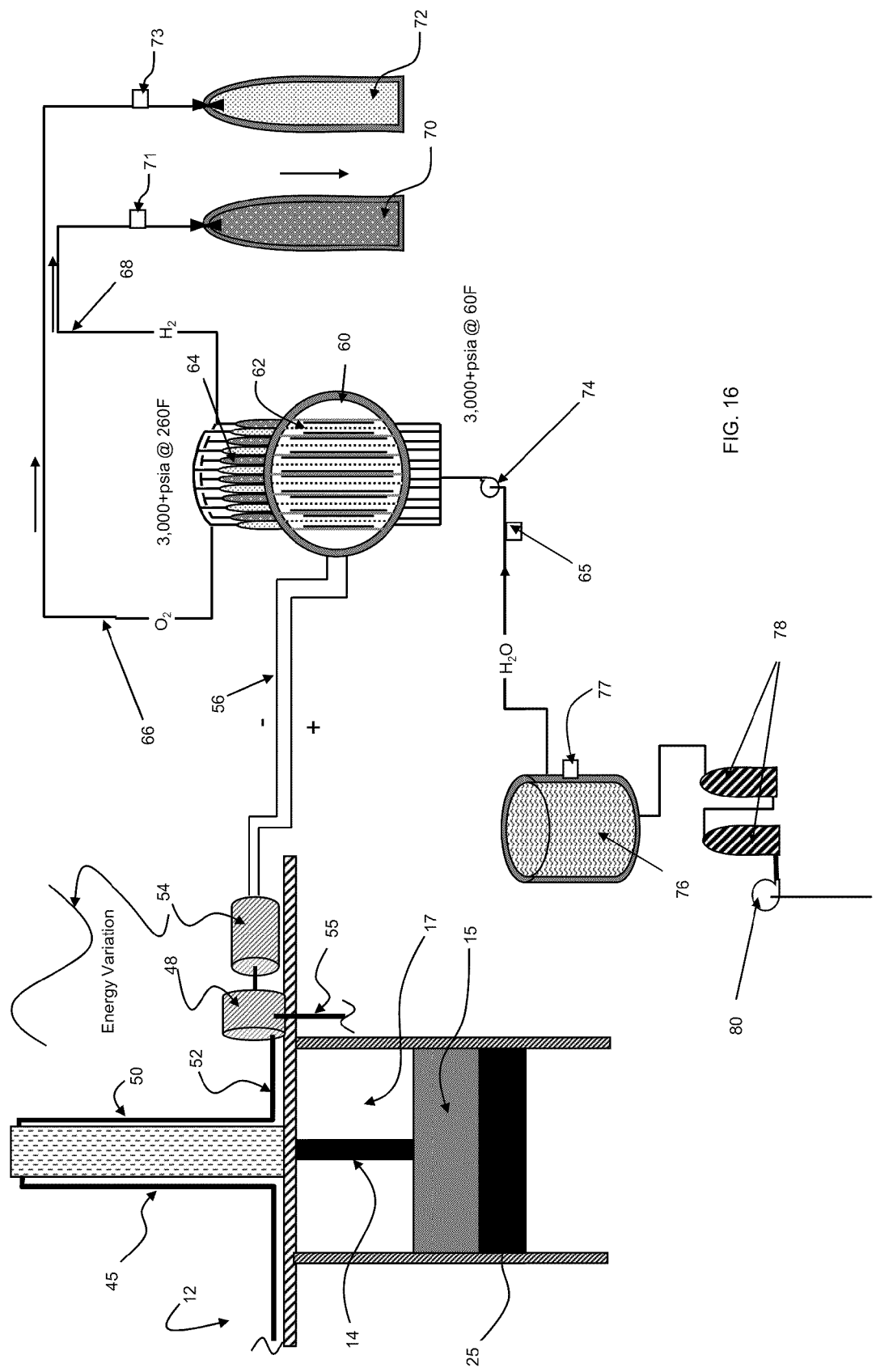
FIG. 16 is a schematic view of a system pursuant to the present invention for converting wave energy to power an electrolysis process.

As can be perceived by reference, for example, to FIGS. 14 through 16, each bobber device 12 draws in external sea water through a raw water supply line 45 and pumps the same through an array of hydraulic distribution lines 50 to a supply line 52 and to one or more positive displacement rotary hydraulic engines 48. The hydraulic engines 48 convert energy in the form of pressure present in the hydraulic supply line 52 to rotary work to drive a direct current generator 54. The positive displacement hydraulic engines 48 efficiently turn energy in moving water under pressure into rotary motion. A positive displacement system offers little to no slippage and promises to be efficient approach and presents an ability to process lower water volumes and speeds while nonetheless providing efficient rotary output. The hydraulic engines 48 are similar to a positive displacement pump that runs backward. Engine speed and power output are functions of the inlet pressures and volumes. Waste water exiting the hydraulic engines 48 discharges back into the sea without environmental impact. More particularly, a discharge line 55 carries seawater under pressure away from the bobber device 12 under low pressure and returns the same to the ocean without changing or adding to the quality of the seawater.

The hydraulic engines 48 drive direct current generators 54 or alternating current generators with a full bridge rectifier converting the current to direct current. The generators 54 can have a field that is energized at all times to capture the entire operating range of the reciprocating float head 15. The hydraulic engines 48 and, additionally or alternatively, other elements of the harvesting vessel 10 can incorporate emergency shut off features to prevent damage under extreme sea conditions. In turn, the electric generators 54 provide electric power through a positive and negative current buss 56 to an electrolyzer 60 for powering an electrolysis process. The buss 56 carries direct current or alternating current, to the generators 54. The current and potentially the voltage will vary depending upon the level of energy conversion occurring at any given time. So powered, the electrolyzer 60 separates purified water into its components, hydrogen and oxygen, in an accumulator 62. The energy harvested will vary from moment to moment depending upon wave conditions.

The electrolyzer 60 can be designed to operate at high pressures, such as at 3,000 psi or above. The electrolysis system can be an alkaline style system similar to that disclosed in my Provisional Patent Application No. 60/823,276, which is incorporated herein by reference. As described in that application, the electrolyzer 60 will have the capability to cut in and out electrolyzer cells to control the back electromotive force applied on the generators 54 and hydraulic engines 48 to prevent stalling and damage during low harvesting periods. A programmable logic controller will monitor the forces on the system and adjust as needed the number of cells that are activated.

Hydrogen and oxygen separate in the electrolyzer cells and collect at the top of the individual cell manifolds 64. There can be two individual manifolds 64 per cell where hydrogen and oxygen collect to be carried away through common hydrogen and oxygen gas transfer lines 66 and 68. No compressor is needed due to the high operating pressures of the electrolyzer 60. The two gases individually fill the hydrogen and oxygen storage containers 70 and 72 from the operation of the high pressure electrolyzer 60, and the gases remain in the storage containers 70 and 72 until fully charged. The system can thus deliver full containers 70 and 72 to the point of use as discussed herein below.

The electrolyzer manifolds 64 allow hydrogen and oxygen to collect separately at the top of the electrolyzer 60. Water separates from the elements through a dry pipe internal to the manifolds and collect into the transfer lines 66 and 68. The manifolds 64 will operate at the same pressures as the electrolyzer 60 thereby negating the need for a gas compressor to store the gases under pressure. As hydrogen and oxygen gases are created in the electrolyzer 60, two manifolds 64 per cell collect hydrogen and oxygen separately. A water level is maintained in the manifolds 64 and the gas bleeds out of the top of the manifolds 64 through control valves controlled by a programmable logic controller programmed to maintain an internal pressure tolerance and water level in the manifolds 64.

The transfer lines 66 and 68 carry compressed gas from the electrolyzer manifolds 64 to the respective storage containers 70 and 72 that can retain gas at approximately the same pressure as the electrolyzer 60. As such, the storage containers 70 and 72 can comprise conventional high pressure containers. The containers 70 and 72 can collect gas as it is produced and can fill over time. As such, the internal pressure will initially be well below that of the electrolyzer 60. A governor 71 inline with the hydrogen transfer line 68 will maintain a constant pressure internal to the electrolyzer 60 while allowing the down stream pressure to drop considerably allowing the storage container 70 to start filling at an empty or near empty state at low pressure and allowing the pressure to rise steadily as additional volumes of gas are added until the pressures on both sides of the governor 71 are in equilibrium. Similarly, a governor 73 inline with the oxygen transfer line 66 will maintain a constant pressure internal to the electrolyzer 60 while the storage container 72 is filled. Once the pressures of the storage containers 70 and 72 equal that of the electrolyzer 60, the storage containers 70 and 72 would be considered full and a change out of containers 70 and 72 would be necessary.

Purified water can be fed to the electrolyzer 60 from the storage container 76. Purified water can be produced at the energy harvesting vessel 10 or can be delivered to the vessel 10 as needed. The purified water can be stored at atmospheric pressure and temperature in a conventional storage container 76, which can be made of non-corrosive materials. If purified water is produced at the energy harvesting vessel 10, seawater is pumped into a reverse osmosis (RO) water purification system 78 intended to remove organics, alkaline, and other damaging and potentially dangerous contaminants from seawater. A positive displacement high pressure pump 80 delivers seawater to the RO system 78.

The purified water exits the RO system 78 and enters the purified water storage tank 76. As needed, water is drawn from the storage tank 76 by an electrolyzer high pressure feed pump 74 and delivered under high pressure to the electrolyzer 60 under the same operating pressure as the electrolyzer 60. Purified water can enter the electrolyzer 60 and can contain a KOH or an NaOH water solution. A programmable logic controller 65 can regulate the amount of water delivered by the electrolyzer pump 74 to the electrolyzer 60. A sensor arrangement 77 can maintain a predetermined level in the storage tank 76, enabling water to be replenished, such as through the Reverse Osmosis purification system 78, as needed. Continual cleaning or removal of contaminants will be required. Brine containing salts and organic matter will be returned to the sea. Since these components already exist in seawater, placing them back into ocean water will not impose any environmental risk.

FIGS. 17A and 17B illustrates a transport vessel 100 that can be used to move hydrogen and oxygen from the wave energy harvesting vessel 10 for end usage, such as by delivery to an on-shore destination. The transport vessel 100 in this exemplary embodiment is founded on a catamaran structure with first and second pontoons 92 and a deck 112. However, it will be clear that the transport vessel 100 can exploit any floating structure that provides the necessary support and storage ability to enable the transport of compressed or liquid hydrogen and oxygen. In certain embodiments, the transport vessel 100 can incorporate one or more sea anchors 26 and 90 as previously described in relation to the harvesting vessel 10. The sea anchor or anchors 26 and 90 could be retractable to allow most efficient movement of the transport vessel 100 when desired.

One or more hydrogen storage containers 94, one or more oxygen storage containers 96, and one or more purified water storage containers 98 can be fixed to the deck 112 of the transport vessel 100. The storage containers 94 and 96 can be designed for gaseous or liquid gas storage and can pursue standard industrial configurations. In certain cases, the storage containers 94 and 96 can be sized and configured for selective removal from the transport vessel 100 to enable removal and transport, such as by truck, train, or other means.

With that, the storage containers 94 and 96 can be transported to shore, removed from the transport vessel 100, and distributed to the point of use without a need for transferring the contents to another container or for providing a pipeline infrastructure. A high pressure hydrogen conduit arrangement 104 in fluidic connection with the hydrogen storage containers 94 can enable a filling of the same, and a high pressure oxygen conduit arrangement 106 in fluidic connection with the oxygen storage containers 96 can enable a filling of those containers 96.

One or more propulsion pods 114 can be disposed on the transport vessel 100 for enabling a powering of the same. The propulsion pods 114 can be powered similarly to or differently than the powering of the propulsion pods 46 on the energy harvesting vessel 10. As such, the propulsion pods 114 can, for example, include propellers or other propulsion means turned by motors that can receive power from electricity, hydrogen, or oxygen, which again can come directly from the energy harvested by the vessel 10 and now imparted to the transport vessel 100. The propulsion pods 114, or at least the propulsion means thereof can be disposed at the lowest point possible on the transport vessel 100, such as by being fixed to a bottom portion of the pontoons 92 thereby to present the propulsion pods 114 with the calmest possible water in which to operate.

In one embodiment, a side of the transport vessel 100 can couple to the stern of the wave energy harvesting vessel 10 in a perpendicular arrangement as shown in FIG. 18A. In another possibility, the bow of the transport vessel 100 can couple to the stern of the harvesting vessel 10. Of course, numerous other configurations are possible. In any case, an umbilical line 102 can be draped from the harvesting vessel 10 to the transport vessel 100 to secure the vessels 10 and 100 together. The umbilical line 102 can also include conduit in fluidic communication with the hydrogen and oxygen storage containers 70 and 72 on the harvesting vessel 10. A coupling arrangement 108 can enable a fluidic coupling between the umbilical line 102 and the hydrogen and oxygen conduit arrangements 104 and 106 and the water storage container 98 thereby to enable a transfer of hydrogen and oxygen from the storage containers 70 and 72 on the energy harvesting vessel 10 to the storage containers 94 and 96 on the transport vessel 100 and, if necessary, a provision of purified water to the energy harvesting vessel 10. The umbilical line 41 will also transport purified water back to the harvest vessel as needed. The umbilical line 102 can contain sufficient structural cabling or the like to enable a securing of the two vessels 10 and 100 to one another while minimizing stress on the contained conduits.

The coupling arrangement 108 can comprise a quick connect and disconnect coupling arrangement. For example, the coupling arrangement 108 can exploit technology similar to aircraft-to-aircraft refueling arrangements but adapted for use in relation to mating pieces that are floating on water. As such, coupling arrangements 108 pursuant to the invention could be adaptations for water-to-water applications of, by way of example, the connection technology and arrangements disclosed in U.S. Pat. No. 5,499,784 to Crabere, et al, for a Flight Refueling System, U.S. Pat. No. 6,644,594 to Hunn et al. for a Flight Refueling Guide, and/or U.S. Pat. No. 6,644,594 to Hunn, et al. for a Flight Refueling Guide, which are each incorporated herein by reference.

As shown in FIG. 18B, for example, the umbilical line 102 can terminate in a female, funnel-type coupling 103 while the hydrogen and oxygen conduit arrangements 104 and 106 can merge into a unified male coupling 105. The female coupling 103 and the male coupling 105 can be crafted to be buoyant whether by integral material selection or by the incorporation of flotation elements (not shown). In certain embodiments, the female coupling 103 and the male coupling 105 can be retained relative to the harvesting vessel 10 and the transport vessel 100 by connections allowing free vertical pivoting but limited horizontal pivoting.

Advantageously, with the floating of the female and male couplings 103 and 105 atop the same water surface, vertical alignment of the couplings 103 and 105 will be automatically aligned from a vertical perspective. Therefore, docking of the transport vessel 100 and the harvesting vessel 10 can be accomplished by relative lateral movement of the vessels 100 and 10 until the female and male couplings 103 and 105 are aligned from a horizontal perspective. Such an alignment could be achieved manually or, possibly, automatically, even autonomously, using technology known to the art. Under an autonomous alignment arrangement, control, whether direct or remote using, for example, gps or visual technology, would then be limited to maneuvering the transport vessel 100 within a predetermined distance from the harvesting vessel 10. At that point, autonomous programming could complete the alignment and fuel docking. Under an alternative embodiment, storage containers 70 and 72 could be movable between the transport and harvesting vessels 100 and 10 thereby to eliminate the need for coupling arrangements and conduits.

The position of the multiple harvesting vessels 10 and transport vessels 100 can be monitored by what can be termed a Flotilla Control Center. The Flotilla Control Center can control transport, docking, and product transfer remotely or manually with minimal personnel thereby to minimize labor costs while maximizing safety. In certain practices of the invention, the Flotilla Control Center, which can be based on shore, can employ global positioning systems to monitor locations and operations of the vessels 10 and 100.

Figure 19:
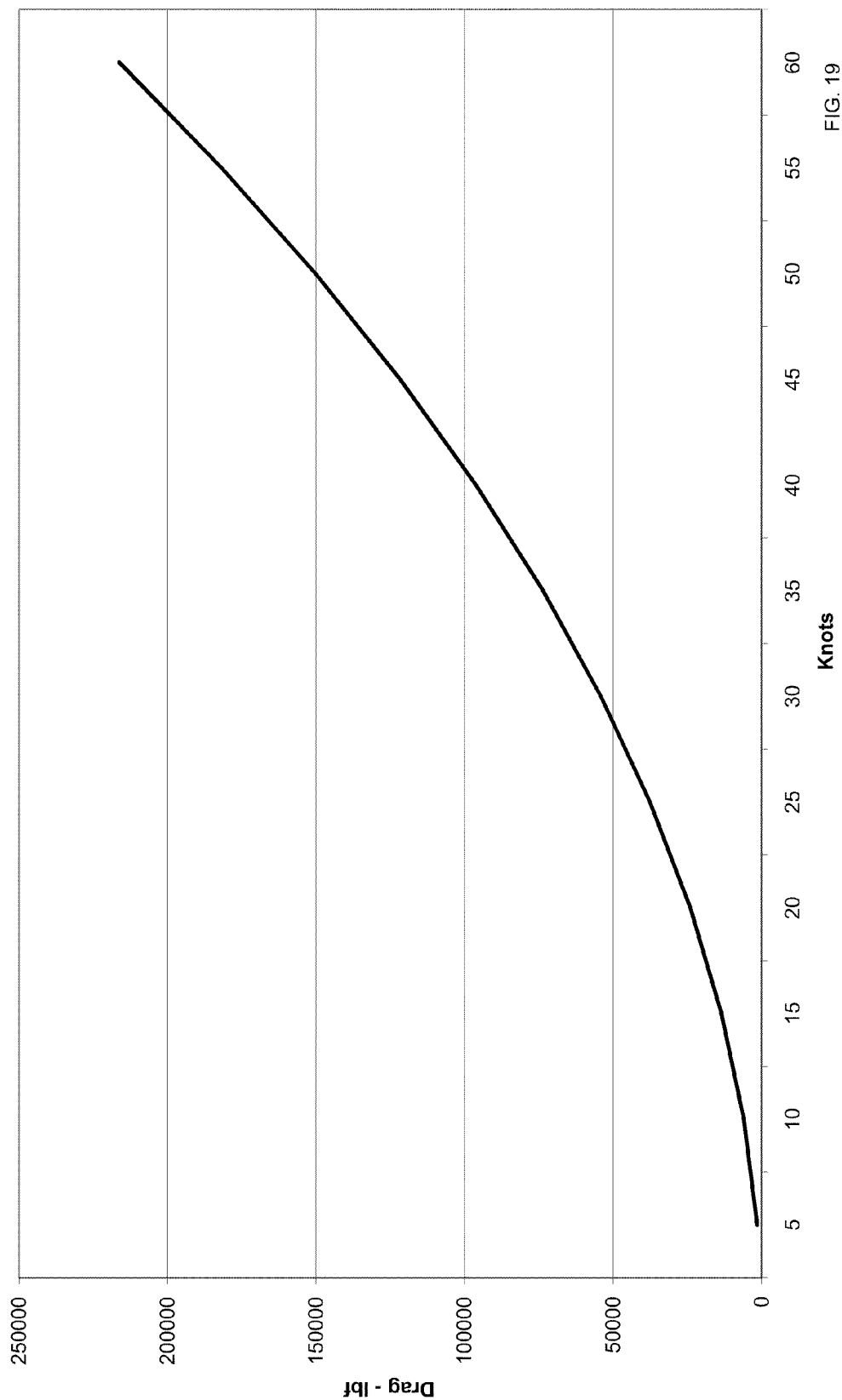
FIG. 19 is a chart of drag as a function of vessel speed.

In cases where the harvesting vessel 10 will operate relatively close to shore, such as within one hundred miles, speed will not be critical, and slow travel may render the transport vessel 100 more efficient. At present, travel at 8 to 10 knots/hr appears to be ideal. FIG. 19 shows drag forces on a 600-foot ship as a function of speed. As FIG. 19 makes clear, drag increases exponentially with speed such that a doubling in speed roughly increases drag by four. Therefore, a vessel will typically maintain better fuel efficiency over a given distance at low speeds than at higher speeds.

FIG. 20 illustrates the relationship of vessel length to drag under the assumption that beam and depth increase at the same proportions as length. From FIG. 20, one will appreciate that there is a trade-off between vessel length and drag. As vessel length increases, the beam and draft increase proportionately to provide proper stability thereby resulting in a large increase in displacement. A doubling of vessel length results in 8 times the displacement and 4 times the drag at the same speed. However, a larger vessel is advantageous in that a larger storage container can be placed on the vessel. For example, a doubling in length results in a corresponding doubling in beam allowing the diameter of a storage container in spherical form to double as well. This results in 8 times the available volume of storage capacity at the same storage pressures. As a result, although doubling vessel length results in 4 times the drag, storage capacity increase 8 times.

Therefore, bigger appears to be better. It is anticipated that there will be economies of scale with large vessels 10 and 100. A flotilla of large vessels 10 and 100 will require lower capital costs per ton of product produced than a flotilla of smaller vessels 10 and 100, which would require vessels 10 and 100 to achieve the same production. Large capital items, such as pontoons 34 and 92 and electrical generators 54, can be held to a minimum by increasing their size. The data below illustrates the effect of increasingly larger systems and the effect on volume output for a single vessel.

| Predicted Annual Product output by throat size; Station 44008 (Located 54 nautical miles southeast of Nantucket) | | | | |
|---|---|---|---|---|
| | $H_2$ | | $O_2$ | |
| Throat Width | Tons | Kg | Tons | Kg |
| 20 | 97 | 88,116 | 743 | 673,822 |
| 40 | 194 | 176,232 | 1,486 | 1,347,664 |
| 80 | 389 | 352,465 | 2,971 | 2,695,328 |
| 160 | 777 | 704,930 | 5,942 | 5,390,657 |
| 320 | 1,554 | 1,409,857 | 11,884 | 10,781,313 |
| 640 | 3,108 | 2,819,718 | 23,768 | 21,562,626 |

Notes:
Hydrogen production = 12.6 $ft^3$/kW for electrolysis ideal; in addition 90% efficiency was used.
$H_2$ = 0.005473 lbs/$ft^3$ = 0.4536 kg/lb = 2000 lbs/ton.
Oxygen Production = 6.3 $ft^3$/kW for electrolysis ideal; in addition 90% efficiency was used.
$O_2$ = 0.083705 lbs/$ft^3$ = 0.4536 kg/lb = 2000 lbs. ton.

As described above, substantially the entire system of energy harvesting vessels 10 and transport vessels 100 is in constant motion. Just like nature, the system is designed to ebb and flow based on weather conditions. Optimal energy harvesting could be furthered by identifying zones in the ocean that are near shore but not visible from shore, such as by being beyond 25 miles. Wave energy conversion vessels 10 would operate within these zones, and the locations of individual vessels 10 would be adjusted depending upon drift and their relative position within the zone. These zones would most likely be agreed upon by consultation with any applicable governmental bodies, such as the United States Coast Guard, to ensure proper locations of operation, including by ensuring that the vessels 10 operate outside normal shipping lanes while possibly ensuring that the vessels 10 operate within the applicable territorial jurisdiction, such as within the jurisdiction of the United States, for enhanced security and safety.

The Flotilla Control Center can monitor and control all vessel movement and transfer of harvested energy. Under certain embodiments, the Flotilla Control Center could be the only location where human involvement is required to achieve the main operations of production and distribution, subject to Coast Guard Regulations. All other activity, except maintenance, could be done through the use of remote controls and communications. Automation and remote control can minimize the potential labor costs and the potential safety risks of handling vessels 10 and 100 at sea loaded with hydrogen and oxygen. However, regulatory requirements may require human presence, particularly while vessels are underway, such that Coast Guard approval would be required for remote operational control while the vessels 10 and 100 are underway.

One key issue to creating a hydrogen economy is to need to produce sufficient quantities of hydrogen at a low enough cost to make hydrogen usage attractive to the general public. The main advantage of the present invention is its relative simplicity in providing a system and method that will produce large quantities of energy, as stored in hydrogen, at relatively low capital cost compared to its alternative energy counterparts, such as wind, solar, wave riding systems, and the like. Once capitalized, normal operating costs are expected to be low, particularly since the energy needed to run system components or to reposition vessels 10 and 100 can be fueled by hydrogen already being produced by the energy harvesting vessel 10. An emphasis on automation to minimize labor costs and expenses for supporting the supply chain will minimize the costs of goods sold in proportion to the amount of product volume manufactured.

The system disclosed herein is also advantageous in that there would be minimal land costs. The ocean surface is free and is twice the size of Earth's land mass. Where the energy harvesting vessel 10 is free floating, it can operate in any water depth and anywhere in the world. The system does require a shore-based facility, which would require an initial capital investment. Economies of scale can be applied to the shore-based facility where additional seagoing units could be added to a given flotilla without changing the size of the facility. Facility size could be dictated in large part by the amount of security stock needed to satisfy demand during low production seasons, such as late summer in the United States Northeast, when average winds are at their annual low.

Also, waves are constantly present. If one views the planet as a huge solar collector where sunlight trickle charges Earth's batteries over time, one can readily conclude that waves and wind would be a preferable method of converting solar energy into a product versus converting energy directly from sunlight. Wave and wind energy are a form of indirect solar energy. Where wind and waves store solar energy over time, there is a more concentrated energy per square foot of surface in both forms. Also, unlike direct solar energy that is available only a portion of the day and is seasonal, wave action occurs all of the time, day or night, summer or winter, resulting in substantially more energy conversion hours available in one year than with direct sunlight. Therefore, the annual energy production form a linear foot of ocean compared to a square foot of Earth's surface from solar energy over a one calendar year is exponentially higher.

With certain details and embodiments of the present invention for systems and methods for harvesting energy from wave oscillation disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Accordingly, it will be clear that those with major features of the invention in mind could craft embodiments that incorporate those major features while not incorporating all of the features included in the preferred embodiments.

Therefore, the following claims are intended to define the scope of protection to be afforded to the inventor. Those claims shall be deemed to include equivalent constructions insofar as they do not depart from the spirit and scope of the invention. It must be further noted that a plurality of the following claims express certain elements as means for performing a specific function, at times without the recital of structure or material. As the law demands, these claims shall be construed to cover not only the corresponding structure and material expressly described in this specification but also all equivalents thereof.

I claim:

1. A system for harvesting energy from wave oscillation, the system comprising:
    an energy harvesting vessel comprising:
    at least one vessel hull for providing buoyancy to the vessel;
    a plurality of bobber devices retained in relation to at least one vessel hull wherein each bobber device comprises a buoyant float head and a means for retaining the float head for reciprocating movement in response to wave oscillation wherein the float head of each bobber device has a buoyant portion sufficient for causing the float head to rise with a rise in water level and a ballast portion sufficient for causing the float head to fall with a lowering in water level wherein the weight of the ballast portion of the float head is adjustable by a means for enabling an addition to or subtraction from a volume of ballast material retained inside the float head; and
    a means for converting the reciprocating movement of the buoyant float heads of the bobber devices to electrical energy;
    whereby energy can be harvested from an oncoming wave.

2. The system of claim 1 wherein multiple bobber devices are disposed in series to establish a column of bobber devices whereby energy can be sequentially harvested from an oncoming wave by the column of bobber devices.

3. The system of claim 2 further comprising a wave channel with an open volume defined by first and second sides for enabling a channeled passage of portions of oncoming waves wherein the column of bobber devices is disposed to allow the float heads of the bobber devices to reciprocate in the open volume of the wave channel.

4. The system of claim 1 wherein there are at least first and second vessel hulls wherein multiple bobber devices are disposed in series to establish a column of bobber devices whereby energy can be sequentially harvested from an oncoming wave by the column of bobber devices and further comprising a wave channel with an open volume defined by first and second sides for enabling a channeled passage of portions of oncoming waves, wherein the column of bobber devices is disposed to allow the float heads of the bobber devices to reciprocate in the open volume of the wave channel, and wherein a side of the first vessel hull forms the first side of the wave channel and wherein a side of the second vessel hull forms the second side of the wave channel.

5. The system of claim 4 wherein there are at least first, second, and third vessel hulls, wherein a first wave channel is disposed between the first and second vessel hulls, wherein a second wave channel is disposed between the second and third vessel hulls, wherein a first column of bobber devices is disposed to allow the float heads of the bobber devices to reciprocate in the open volume of the first wave channel, and wherein a second column of bobber devices is disposed to allow the float heads of the bobber devices to reciprocate in the open volume of the second wave channel.

6. The system of claim 4 wherein the wave channel is tapered from a lower portion to an upper portion thereof.

7. The system of claim 6 wherein first and second vessel hulls have first and second ends and wherein the first and second vessel hulls narrow toward their first and second ends whereby the wave channel narrows from a first end thereof toward a mid-portion thereof and whereby the wave channel broadens from the mid-portion thereof toward a second end thereof.

8. The system of claim 7 wherein the first and second hulls are blade shaped in cross section.

9. The system of claim 1 wherein each bobber device further comprises a pump housing and a piston head disposed within the pump housing wherein the piston head is coupled for reciprocating movement in response to the reciprocating movement of the float head whereby the bobber devices can operate as hydraulic pumps capable of emitting pressurized fluid.

10. The system of claim 9 wherein the energy harvesting vessel further comprises a conversion arrangement in fluidic connection with the bobber devices for receiving pressurized fluid from the bobber devices and for employing the pressurized fluid to generate electricity.

11. The system of claim 10 wherein the conversion arrangement comprises a hydraulic engine in combination with a generator.

12. The system of claim 10 wherein the energy harvesting vessel further comprises an electrolyzer in electrical communication with the conversion arrangement and a source of water in fluidic communication with the electrolyzer whereby the bobber devices can produce electricity to power an electrolysis process to enable a separation of water supplied to the electrolyzer into hydrogen and oxygen.

13. The system of claim 12 wherein the electrolyzer comprises a high pressure electrolyzer operative at pressures of 3,000 psi or greater.

14. The system of claim 12 wherein the source of water comprises a reverse osmosis (RO) water purification system for providing purified water from seawater.

15. The system of claim 12 wherein the energy harvesting vessel further comprises a storage container in fluidic communication with the electrolyzer for enabling storage of hydrogen from the electrolyzer.

16. The system of claim 15 further comprising a transport vessel for enabling a removal of hydrogen from the energy harvesting vessel and a transport of the hydrogen to a destination wherein the transport vessel has at least one vessel hull, a means for enabling a storage of hydrogen in relation to the transport vessel, and a means for enabling a transfer of hydrogen from the energy harvesting vessel to the transport vessel.

17. The system of claim 16 wherein the transport vessel further comprises a storage container for enabling storage of hydrogen in relation to the transport vessel.

18. The system of claim 17 wherein the means for enabling a transfer of hydrogen from the energy harvesting vessel to the transport vessel comprises a conduit arrangement in fluidic association with the storage container of the transport vessel, a conduit arrangement in fluidic association with the storage container of the energy harvesting vessel, and a means for enabling a coupling of the conduit arrangements of the energy harvesting vessel and the transport vessel.

19. The system of claim 18 wherein the means for enabling a coupling of the conduit arrangements comprises a quick connect and disconnect coupling arrangement with a male coupling and a female coupling.

20. The system of claim 19 wherein the male and female couplings of the coupling arrangements are buoyant.

21. The system of claim 1 wherein the energy harvesting vessel further comprises a sea anchor fixed in relation to the at least one vessel hull.

22. The system of claim 21 wherein the vessel hull has a waterline and wherein the sea anchor comprises a vertical movement sea anchor for resisting vertical movement of the vessel, the vertical movement sea anchor comprising a substantially continuous surface fixed to the vessel hull below the waterline.

23. A system for harvesting energy from wave oscillation, the system comprising:
an energy harvesting vessel comprising:
at least one vessel hull for providing buoyancy to the vessel;
a plurality of bobber devices retained in relation to at least one vessel hull wherein each bobber device comprises a buoyant float head and a means for retaining the float head for reciprocating movement in response to wave oscillation; and
a means for converting the reciprocating movement of the buoyant float heads of the bobber devices to electrical energy;
a sea anchor fixed in relation to the at least one vessel hull wherein the sea anchor comprises a horizontal movement sea anchor for resisting horizontal movement across a body of water in response to wind and wave forces, the horizontal movement sea anchor comprising a framework, a plurality of apertures in the framework, and a corresponding plurality of means for closing the apertures;
whereby energy can be harvested from an oncoming wave.

24. The system of claim 23 wherein the plurality of means for closing the apertures comprises a plurality of doors hingedly coupled to the framework of the sea anchor.

25. The system of claim 23 wherein there are at least first and second vessel hulls, wherein the first and second vessel hulls have a common longitudinal orientation, and wherein the framework of the horizontal movement sea anchor is retained substantially perpendicularly to the longitudinal orientation of the first and second vessel hulls.

26. The system of claim 25 wherein the framework of the horizontal movement sea anchor is secured adjacent to a bottom of the at least one vessel hull.

27. The system of claim 23 wherein the energy harvesting vessel further comprises a propulsion pod operably associated with the at least one vessel hull and a means for powering the propulsion pod with energy harvested by the vessel.

28. The system of claim 27 wherein the means for powering the propulsion pod with energy harvested by the vessel comprises a pump housing and a piston head coupled for reciprocating movement within the pump housing in response to the reciprocating movement of the float head whereby the bobber devices can operate as hydraulic pumps capable of emitting pressurized fluid, a conversion arrangement in fluidic connection with the bobber devices for receiving pressurized fluid from the bobber devices and for employing the pressurized fluid to generate electricity, an electrolyzer in electrical communication with the conversion arrangement, and a source of water in fluidic communication with the electrolyzer whereby the bobber devices can produce electricity to power an electrolysis process to enable a separation of water supplied to the electrolyzer into hydrogen and oxygen, and a means for providing hydrogen or oxygen to the propulsion pod for powering the propulsion pod.

* * * * *